(12) United States Patent
Kakimoto et al.

(10) Patent No.: US 7,965,600 B2
(45) Date of Patent: Jun. 21, 2011

(54) DATA RECORDING EVALUATION METHOD AND OPTICAL DISK RECORDING AND REPRODUCTION DEVICE

(75) Inventors: Hiroya Kakimoto, Gunma (JP); Fuyuki Miyazawa, Gunma (JP); Mitsuo Sekiguchi, Gunma (JP); Katsuhiro Oyama, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 619 days.

(21) Appl. No.: 11/965,505

(22) Filed: Dec. 27, 2007

(65) Prior Publication Data

US 2008/0205221 A1 Aug. 28, 2008

(30) Foreign Application Priority Data

Dec. 27, 2006 (JP) ................................. 2006-352370

(51) Int. Cl.
*G11B 7/00* (2006.01)
(52) U.S. Cl. .................................... 369/53.31; 369/53.2
(58) Field of Classification Search .................. 369/53.2, 369/53.31, 53.35, 53.11, 53.22
See application file for complete search history.

(56) References Cited

U.S. PATENT DOCUMENTS

| | | | | |
|---|---|---|---|---|
| 5,305,297 A | * | 4/1994 | Nishiuchi et al. .............. | 369/116 |
| 5,587,980 A | * | 12/1996 | Kablau et al. ............... | 369/53.31 |
| 5,696,756 A | * | 12/1997 | Fujimoto et al. ............ | 369/275.4 |
| 6,785,210 B2 | * | 8/2004 | Noda et al. .................. | 369/53.22 |
| 2003/0090980 A1 | * | 5/2003 | Kashihara et al. .......... | 369/53.31 |
| 2004/0052178 A1 | * | 3/2004 | Saga .......................... | 369/47.53 |
| 2005/0243670 A1 | * | 11/2005 | Kakimoto et al. ......... | 369/47.53 |

FOREIGN PATENT DOCUMENTS

| | | |
|---|---|---|
| EP | 1 443 509 A2 | 4/2004 |
| JP | 2002-197660 | 7/2002 |
| JP | 2003-141823 | 5/2003 |
| JP | 2003-151219 | 5/2003 |
| JP | 2003-303417 | 10/2003 |
| JP | 2004-253114 | 9/2004 |
| JP | 2004-335079 | 11/2004 |

* cited by examiner

*Primary Examiner* — Wayne R Young
*Assistant Examiner* — Thomas D Alunkal
(74) *Attorney, Agent, or Firm* — Law Office of Katsuhiro Arai

(57) ABSTRACT

Novel evaluation indexes are introduced to allow both a total evaluation of data recording and an evaluation of individual detection patterns. A data recording evaluation method includes a step of reproducing a result of data recording performed on an optical disk and identifying a predetermined detection pattern in a reproduction signal, a step of detecting a signal state of the reproduction signal associated with the predetermined detection pattern, and a first calculation step for calculating a first evaluation index value based on the detected signal state and a reference state identified from the predetermined detection pattern. When there is a plurality of predetermined detection patterns as described above, a second calculation step is further provided for calculating a second recording state evaluation index value using the first evaluation index value calculated from each of the predetermined detection patterns. Data recording can be properly evaluated using the first and second recording state evaluation index values.

23 Claims, 18 Drawing Sheets

DATA RECORDING EVALUATION METHOD AND OPTICAL DISK RECORDING AND REPRODUCTION DEVICE

BACKGROUND OF THE INVENTION

1. Field of the Invention

The present invention relates to a technique for evaluating recording of data on an optical disk.

2. Description of the Related Art

Optical disks such as write-once type Blue-ray discs (hereinafter referred to as "BD-R") and write-once type HD-DVD discs (hereinafter referred to as "HD-DVD-R") are constructed by forming a recording layer, a reflective layer, and a protective layer if necessary on one surface of a substrate in the form of a light-transmitting disk. Spiral or concentric grooves are formed on the surface of the substrate having a recording layer and a reflective layer formed thereon, and convex parts called lands are formed between adjoining grooves. Recording is performed on such an optical disk by irradiating the recording layer on the grooves with a recording laser beam from an optical disk recording and reproduction device so as to track the grooves with the beam, thereby forming pits on the recording layer. Reproduction is performed by irradiating an array formed by such pits which have a length nT (T representing the length of bits between reference channel clocks, nT representing a length that is n times the length T (n is an integer)) and intervals having a length nT between the pits (hereinafter referred to as "spaces") and converting light reflected by the array into a reproduction signal.

An optical disk recording and reproduction device performing recording and reproduction in such a manner is designed to accommodate variation of recording conditions which can occur each time recording is performed on each optical disk because of, for example, the disk drive used, the optical disk (also called medium), and the recording velocity. In order to accommodate such variation of recording conditions, recording and reproduction devices as described above employ techniques for setting an optimum laser light intensity (hereinafter referred to as "recording power"). Referring to such techniques, some devices of this type employ OPC (Optimal Power Calibration) as one means for selection OPC involves test recording which is performed in a test area (power calibration area) of a recording disk with recording power varied prior to data recording. Then, results of the test recording are compared with initial conditions registered in advance to select and set best recording power which provides high recording quality. Recording in a data recording region of an optical disk is performed with a recording laser beam having the best recording power thus set. Then, various evaluation indexes are calculated from waveforms reproduced from recorded waveforms, the indexes serving as parameters indicating states of recording reflecting changes in recording and reproduction signals caused by varying recording power conditions. The best recording power is determined such that the values of the indexes agree or approach target values to perform optimal correction of recording.

This goal is achieved by various techniques which will be briefly described including examples of the use of techniques based on the PRML (Partial Response Maximum Likelihood) signal processing method. The PRML, signal processing method is to process imperfect frequency responses causing inter-symbol interferences with frequency responses which provide a distortion-free condition, and the method is used in combination with a maximum likelihood decoding technique to prevent any reduction in signal quantity by eliminating inter-symbol interferences.

For example, Japanese Unexamined Patent Publication JP-A-2004-335079 has disclosed a technique for setting a recording parameter which is optimal for the maximum likelihood decoding method. Specifically, a calculation is carried out to obtain a reliability value |Pa−Pb|−Pstd| of the result of maximum likelihood decoding of a region which corresponds to leading and end portions of recorded marks and in which maximum likelihood decoding can result in an error at a high probability. Such a calculation is carried out for each of a combination of a predetermined mark length and a space length immediately preceding the same and a combination of the mark length and a space length immediately following the same. A recording parameter providing an optimal edge shift position is obtained from results of such calculations, and recording is performed such that the recording parameter thus obtained is reflected.

Japanese Unexamined Patent Publication JP-A-2003-303417 has disclosed a technique for accurately optimizing a recording strategy without any influence of noises even when the recording is performed in a high density. Specifically, a pulse response is determined so as to minimize a difference between a reproduction waveform obtained by reproducing a recording pulse signal, which is recording data having a high frequency pulse superimposed thereon, recorded on an optical recording medium and a waveform obtained by performing a convolution calculation between the recording data and the pulse response. Thus, the recording strategy is optimized. At this time, the same recording pulse waveform is recorded three times or more in the same track of the optical recording medium, and an average of sampling values of a reproduced waveform is obtained for each sampling sequence, and the averages are used as data of the reproduced waveform. Since averaged data are used, it is possible to eliminate any influence of random noises on the reproduced waveform.

Further, Japanese Unexamined Patent Publication JP-A-2003-151219 has disclosed a technique relating to the evaluation of quality of a reproduction signal. Specifically, the technique utilizes a predetermined reproduction signal, a first pattern which is associated with the pattern of a signal waveform of the reproduction signal, and an arbitrary pattern (a second or third pattern) which is different from the first pattern and which is associated with the pattern of the signal waveform of the reproduction signal. First, a difference $D=Ee-Eo$ between a distance Eo between the reproduction signal and the first pattern and a distance Ee between the reproduction signal and the arbitrary pattern is obtained. Next, a plurality of samples of reproduction signals is examined to obtain a distribution of such distance differences D. A quality evaluation parameter (M/σ) for reproduction signals is defined based on the ratio of the mean M of the distance differences D thus obtained to the standard deviation σ of the distribution of the distance differences D thus obtained. Then, the quality of the reproduction signal is judged from an evaluation index value (Mgn) represented by the quality evaluation parameter.

Japanese Unexamined Patent Publication No. JP-A-2003-141823 has disclosed a technique for evaluating the quality of a signal from an index which allows the error rate of a binarization result obtained using maximum likelihood decoding to be properly estimated. Specifically, let us assume a maximum likelihood decoding scheme which involves a plurality of states at a time k (k is an arbitrary integer) and employs state transition rules providing n (n is 2 or a greater integer) state transition lines that a transition from a state at a time k−j (j is 2 or a greater integer) to a state at the time k can follow, the scheme estimating the state transition line having the highest probability among the n state transition lines. Then, let us assume that PA represents the probability of a state transition from a state at the time k−j to a state at the time k following the state transition line having the highest probability among the n state transition lines; PB represents the probability of a state transition from a state at the time k−j to a state at the time k following the state transition line having the second highest probability among the n state transition lines; and |PA−PB| represents the reliability of a result of decoding performed from the time k−j until the time k. Then, the value |PA−PB| is obtained for a predetermined period of time or obtained a predetermined number of times. Variation of the value |PA−PB| is identified to obtain an index indicating the quality of a signal that is correlated with the error rate of a binarization result obtained using maximum likelihood decoding.

Further, Japanese Unexamined Patent Publication No. JP-A-2002-197660 has disclosed a recorded state detecting technique which makes it possible to detect the state of recording that depends on the channel when reproducing information recorded in a high density using a Viterbi detector. Specifically, a reproduction signal read out from a disk device is corrected by a band-pass filter and an equalizer to impart specific channel characteristics to the same, and the signal is thereafter read as a digital signal $x_i$ with an A-D converter at the timing of a synchronous clock generated by a PLL circuit. The signal $x_i$ is input to the Viterbi detector to obtain a Viterbi detection output signal. The Viterbi detection output is input to a reference level judgment device and an error margin calculation circuit. The error margin calculation circuit calculates a difference Ei between the digital signal $x_i$ and the Viterbi detection output and outputs the difference to a recording state detecting circuit. The recording state detecting circuit detects the amplitude or amplitude level and asymmetry of the difference using an output from the reference level judgment device and outputs the detected information.

Although there are various techniques for evaluating data recording as described above, those techniques have not been necessarily successful in establishing appropriate association between an evaluation of data recording as a whole and an evaluation of data recording of individual recorded patterns.

It is an object of the invention to provide a technique in which a novel evaluation index is employed to make a total evaluation of data recording.

It is another object of the invention is to provide a technique in which a novel evaluation index is employed to allow individual recorded patterns to be properly evaluated.

It is another object of the invention to provide a technique for allowing appropriate association to be established between a total evaluation of data recording and an evaluation of data recording of individual recorded patterns.

It is still another object of the invention to provide a technique for adequately adjusting recording conditions or recording parameters based on an evaluation of data recording.

SUMMARY OF THE INVENTION

A data recording evaluation method according to the invention includes a step of reproducing a result of data recording performed on an optical disk for a predetermined period and detecting a reproduction signal based on the reproduction, a step of identifying a detection pattern including a predetermined symbol from the detected reproduction signal, a step of detecting a signal state of the reproduction signal associated with the detection pattern, and a first calculation step for calculating a first evaluation index value based on the detected signal state and a reference state identified from the detection pattern.

By calculating such a first evaluation index value, it can be judged whether data recording has been properly performed for a predetermined detection pattern in terms of the relationship between the pattern and a reference state. That is, each record pattern can be properly evaluated.

When there is a plurality of detection patterns as described above, a second calculation step may be provided for calculating a second evaluation index value using the first evaluation index value for each of the predetermined detection patterns. By calculating such a second evaluation index value, comprehensive evaluation can be made on data recording involving various record patterns.

A first changing step may be provided for changing a recording condition for data recording based on the second evaluation index value. Thus, a recording condition of data recording can be properly adjusted in a comprehensive manner based on the second evaluation index value.

The second calculation step may include a step of calculating the sum of a plurality of products of probabilities of occurrence of the detection patterns and the first evaluation index value of each of the detection patterns conforming to the probabilities of occurrence. The purpose is to impart a greater weight to detection patterns occurring at a higher frequency, so that the influence of such patterns on data recording is reflected in the second evaluation index value in a comprehensive manner.

The method according to the invention may further include a step of judging whether the second evaluation index value exceeds a predetermined threshold and a step of identifying the detection patterns affecting the second evaluation index value to a certain degree or more (detection patterns having a predetermined value or more or detection patterns in a predetermined number or more) based on the first recording state evaluation index values associated with the patterns when the second evaluation index value exceeds the predetermined threshold. Thus, recording patterns which may cause a problem can be identified.

The method according to the invention may further include a second changing step for changing a recording parameter used for data recording based on the first evaluation index values of the detection patterns identified. As a result, a recording parameter can be effectively adjusted.

The above-described detection pattern may be a pattern including at least one mark and one space.

Further, the detection pattern may be a detection pattern having a probability of occurrence equal to or higher than a predetermined value. Thus, a detection pattern having an extremely low frequency of occurrence is excluded from the object of processing to reduce processing load.

The first changing step may include a step of identifying a recording condition in a range in which the second evaluation index value is optimal from data indicating a relationship between the recording condition and the second evaluation index value calculated based on data obtained by reproducing a result of data recording performed under the recording condition for a predetermined period. For example, it is possible to identify a most preferable recording condition before starting data recording or during data recording.

The first changing step may include a step of calculating a correction amount for the present recording condition using the present second evaluation index value and data indicating a relationship between the recording condition and the second evaluation index value calculated based on data obtained by reproducing a result of data recording performed under the recording condition for a predetermined period. Thus, the second evaluation index value can be used for adjusting a recording condition during data recording.

The data indicating a relationship between the recording condition and the second evaluation index value calculated based on data obtained by reproducing a result of data recording performed under the recording condition for a predetermined period may be data obtained when test recording is carried out. This alternative is provided because a test condition can be varied during test recording to calculate a second evaluation index value suitable for each case of the test condition.

The second changing step may include a step of identifying a recording parameter at which the first evaluation index value is optimal from data indicating a relationship between the recording parameter and the first evaluation index value calculated based on data obtained by reproducing a predetermined period of a result of data recording performed using the recording parameter.

The second changing step may include a step of calculating a correction amount for the present recording parameter using the present first evaluation index value and data indicating a relationship between the recording parameter and the first evaluation index value calculated based on data obtained by reproducing a predetermined period of a result of data recording performed using the recording parameter.

The data indicating a relationship between the recording parameter and the first evaluation index value calculated based on data obtained by reproducing a predetermined period of a result of data recording performed using the recording parameter may be data obtained when test recording is performed.

The first calculation step may include a step of calculating the magnitude of a difference between the detected signal state and the reference state identified from the detection pattern. Thus, the method can sufficiently accommodate optical disk recording and reproduction systems for high-density recording and reproduction using a PRML signal processing method (systems according to the Blu-ray standard or HD-DVD standard).

An optical disk recording and reproduction system (also called an optical disk recording and reproduction device) for high-density recording and reproduction according to the invention includes a unit for reproducing a predetermined period of a result of data recording performed on an optical disk and identifying a predetermined detection pattern in a resultant reproduction signal, a unit for detecting a signal state of the reproduction signal associated with the detection pattern, and a unit for calculating a first evaluation index value based on the detected signal state and a reference state identified from the detection pattern.

When there is a plurality of predetermined detection patterns as described above, a second calculation unit may be provided for calculating a second evaluation index value using the first evaluation index value for each of the detection patterns.

Further, the optical disk recording and reproduction device according to the invention may further include a first changing unit for changing a recording condition for data recording based on the second evaluation index value.

The second calculation unit may calculate the sum of a plurality of products of the probability of occurrence of the predetermined detection patterns and the first evaluation index value of each of detection patterns conforming to the probability of occurrence.

The optical disk recording and reproduction device according to the invention may further include a unit for judging whether the second evaluation index value exceeds a predetermined threshold and a unit for identifying the detection patterns affecting the second evaluation index value to a certain degree or more based on the first evaluation index values associated with the patterns when the second evaluation index value exceeds the predetermined threshold.

The optical disk recording and reproduction device according to the invention may further include a second changing unit for changing a recording parameter used for data recording based on the first evaluation index values of the detection patterns identified.

A first optical information recording medium according to the invention contains a record of a threshold recorded therein for a first evaluation index value associated with a gap between a signal state associated with a detection pattern identified from a reproduction signal and a reference state identified from the detection pattern and a threshold for a second evaluation index value calculated by summing a plurality of products of the detection pattern and probabilities of occurrence thereof.

A second optical information recording medium according to the invention contains a record of data indicating a relationship between a first evaluation index value associated with a gap between a signal state associated with a detection pattern identified from a reproduction signal and a reference state identified from the detection pattern, a second evaluation index value calculated by summing a plurality of products of the detection pattern and probabilities of occurrence thereof, and a recording condition for data recording based on which the second evaluation index value is calculated.

A third optical information recording medium according to the invention contains a record of data indicating a relationship between a first evaluation index value associated with a gap between a signal state associated with a detection pattern identified from a reproduction signal and a reference state identified from the detection pattern and a recording parameter for data recording based on which the first evaluation index value is calculated.

A program for causing a processor to execute the data recording evaluation method according to an embodiment of the invention may be created. Such a program is stored in, for example, an optical disk such as a flexible disk or CD-ROM, a magneto-optical disk, a storage medium or storage device such as a semiconductor memory or hard disk, or a nonvolatile memory of a processor. The program may be distributed in the form of digital signals through a network. Data under processing may be temporarily stored in a storage device such as a memory of a processor.

The invention makes it possible to make a total evaluation of data recording by employing a novel evaluation index.

In another aspect of the invention, each record pattern can be properly evaluated by employing a novel evaluation index.

In still another aspect of the invention, a total evaluation of data recording and an evaluation of data recording of each record pattern can be properly associated with each other.

In still another aspect of the invention, a recording condition or recording parameter can be properly adjusted based on an evaluation of data recording.

BRIEF DESCRIPTION OF THE DRAWINGS

DESCRIPTION OF THE PREFERRED EMBODIMENT (1) Evaluation Index PRerror for Each Pattern FIG. 1 shows amplitude levels read from a predetermined detection pattern which is, for example, a 4T mark (a mark having a length 4T which may be called a pit), the mark being read along with 3T spaces (spaces having a length 3T which may be called lands) provided adjacent to the same on both sides thereof. In FIG. 1, the vertical axis represents amplitude levels, and the horizontal axis represents data samples of position information of the 4T mark in the moving direction thereof, the samples being under influence of the 3T spaces adjacent to the mark. The influence of the adjacent spaces is more significant, the further the part of interest of the mark 4T from the center of the mark. When PR(1, 2, 2, 1) according to the Blu-ray standard is used, an ideal detection signal (ideal signal) or reference state of the above-described pattern has amplitude levels converted and plotted from an ideal signal obtained from profile values (1, 3, 5, 6, 5, 3, 1) under an exemplary media condition in which the quantity of reflected light at a mark is greater than the quantity of reflected light at a space, i.e., a "low to high" condition. On the contrary, the amplitude level of an actual detection signal has a peak value at the central position of the 4T mark, and amplitude level values in positions apart from the central position which are under the influence of the adjacent spaces are plotted by converting them such that they are at the same ratios as those of ideal signal values. As shown in FIG. 1, those values can deviate from the reference state depending on the hardware, the medium (also called a disk), and the recording condition. Under the circumstance, Expression 1 is used to quantify a gap between an ideal signal and a detection signal (a first evaluation index value is obtained) to evaluate the state of recording (first calculation step).

$$\text{PRerror\_ptn}(p) = \sqrt{\left\{\sum_{x=a}^{a+n-1}(D(x)-R(x))^2\right\}/n} \quad (1)$$

where D(x) represents the value of the detection signal; R(x) represents the value of the ideal signal; x represents a data profile number; a represents a calculation starting data number; n represents the number of calculated data samples; and p represents a recording pattern type (number).

The above description is based on an assumption that PR(1, 2, 2, 1) according to the Blu-ray standard is used, and the description equally applies to PR(1,2,2,2,1) used in the HD-DVD standard. The description applies to a media condition under which the quantity of reflected light from marks is smaller than the quantity of reflected light from spaces i.e., a "high-to-low" condition unlike the condition of the above-described example. Further, the pattern described above is merely an example, and other patterns can be also evaluated using Expression 1. For example, the objects of the invention can be achieved in applications employing a set sign pattern (also referred to as "set record pattern") including a 2T space or mark, a 2T mark or space, and a 2T space or mark; a set record pattern including a 2T space or mark, a 3T mark or space, and a 2T space or mark; a set record pattern including a 2T space or mark, a 4T mark or space, and a 2T space or mark; a set record pattern including a 3T space or mark, a 2T mark or space, and a 3T space or mark; a set record pattern including a 4T space or mark, a 2T mark or space, and a 4T space or mark; or a set record pattern including a 4T space or mark, a 3T mark or space, and a 4T space or mark.

Figure 1:
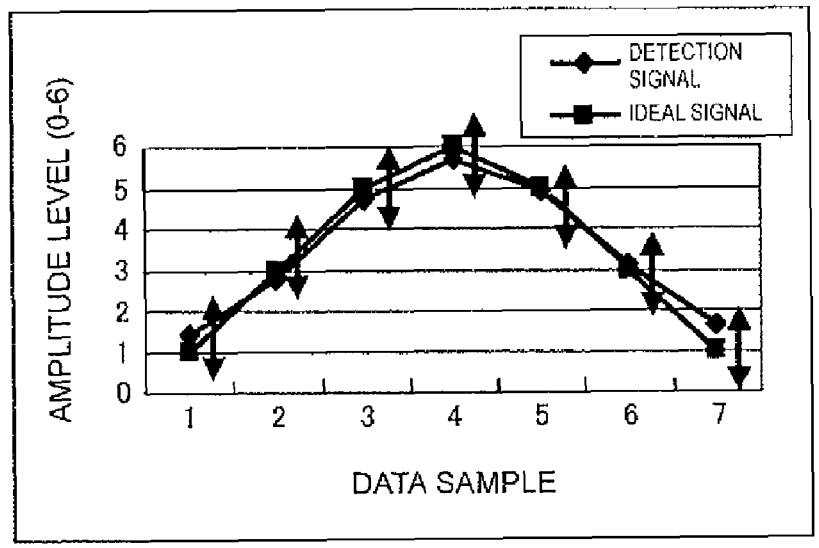
FIG. 1 is a graph showing transitions of an amplitude level with time.

For example, an index PRerror_ptn(p) to serve as a first evaluation index value is calculated using seven points including a peak value in the middle of the group of points where a=1 and n=7. Alternatively, the index PRerror_ptn(p) may be calculated using three points including a peak value in the middle of the group of points where a=3 and n=3. The reference "p" represents a number which is assigned to specify set record patterns and which indicates the number of set record patterns required to make an evaluation. The number depends on the definition of the number of symbols arranged to form a unit set record pattern. It should be noted that a "mark_space_mark" pattern must be reflected in the above-described calculation as one set record pattern in addition to the "space_mark_space" pattern when the calculation is applied to the example shown in FIG. 1. That is, when set recording patterns having the same nT are considered, a more preferable result can be obtained by reflecting a mark and a space in the calculation at the same time. Although the above description has been made with reference to three nT set record patterns, the objects of the invention can be achieved even when there are two set record patterns, four set record patterns, or five set record patterns as long as they are set record patterns having a probability of occurrence that can affect an error.

Further, while expression 1 is a calculation performed when a record pattern p is detected once, it is desirable in practice to obtain an average of a plurality of values (cnt(p)) when the influence of variations in recording or detection are considered. The reference "cnt(p)" represents the number of detection counts of set record patterns p obtained from sample data having a predetermined length. Preferably, the index PRerror_ptn(p) calculated each time a pattern is detected is recorded in a memory as PRerror_ptn(p, cnt(p)), and an average of such values is used to derive the final value of the index PRerror_ptn(p).

(2) Total Evaluation Index PRerror_ttl

A description will be made on how to make a total evaluation of a reproduction signal using the index PRerror_ptn(p) as described above.

Each set record pattern p has a different frequency of occurrence within a predetermined range of data, and each pattern affects recording characteristics to a different degree. That is, a record pattern is more likely to affect recording characteristics, the higher the frequency of occurrence of the pattern. Therefore, a total evaluation of recording characteristics of a reproduction signal is preferably made by calculating an index PRerror-ttl to serve as a second evaluation index value for total quantification of the reproduction signal using the characteristics value PRerror_ptn(p) of set record patterns p and the probabilities of occurrence (or frequencies of occurrence) of the record patterns p within a predetermined range of data. Specifically, the index PRerror_ttl is calculated using the following expression.

$$PRerror\_ttl = \sum_p PRerror\_ptn(p) * \text{Probability of Occurrence}(p)$$

Figure 2:
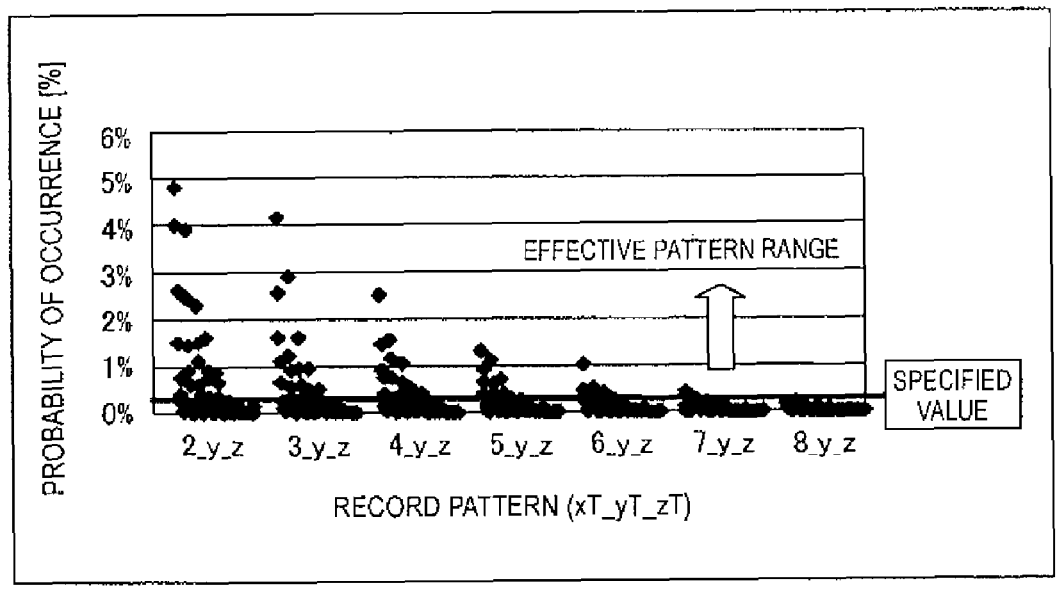
FIG. 2 is a graph showing a relationship between record patterns and probabilities of occurrence thereof.

FIG. 2 shows an example of a relationship between a multiplicity of set record patterns and their probabilities of occurrence. In FIG. 2, the vertical axis represents probabilities of occurrence where the probabilities of the entire record patterns total at 100%, and the horizontal axis represents record pattern types where a row of three set signs [T] constitutes one set record pattern. The numeral 2 among the references shown along the horizontal axis is a space or mark symbol representing x that is the first (leading) symbol of a pattern, and the following y and z represent the second (middle) mark or space symbol y[T] and the third (trailing) space or mark symbol z[T], respectively. The symbols y and z have a value in the range from 2[T] to 8[T] (2[T] to 9[T] when a synchronous sign is included) expressed according to the 1-7PP modulation system adopted in the Blu-ray standard. The symbols have a greater value, the closer to the right side of FIG. 2 they are. As will be apparent from FIG. 2, a symbol has a higher probability of occurrence, the shorter it is. Therefore, a set record pattern has a higher probability of occurrence, the shorter the symbols used in the pattern. Conversely, a record pattern has a lower probability of occurrence, the longer the symbols used in the pattern. When marks and spaces that are short symbols appear repeatedly as thus described, a resultant reproduction signal has small amplitude levels, which means that there is a high possibility of occurrence of an error. This is why the invention utilizes probability of occurrence.

As described above, when a record pattern has a high probability of occurrence, it is assumed that the recording characteristics of the record pattern, i.e., the magnitude of the value given by the expression of the index PRerror_ptn(p) has significant influence on the entire recording characteristics. This assumption may be taken the other way as meaning that a set record pattern having an extremely low probability of occurrence may be left out of consideration because the magnitude of a value representing the recording characteristics (PRerror_ptn(p) described above) of such a pattern is not so significantly reflected in the entire recording characteristics.

Therefore, total quantification of the recording characteristics of a reproduction signal may be carried out using only record patterns equal to or greater than a specified value as effective patterns where the specified value is a predetermined probability of occurrence. Thus, a desired characteristic value (index PRerror_ttl) can be achieved with a reduced load of calculation while maintaining the accuracy of the characteristics value.

Figure 3:
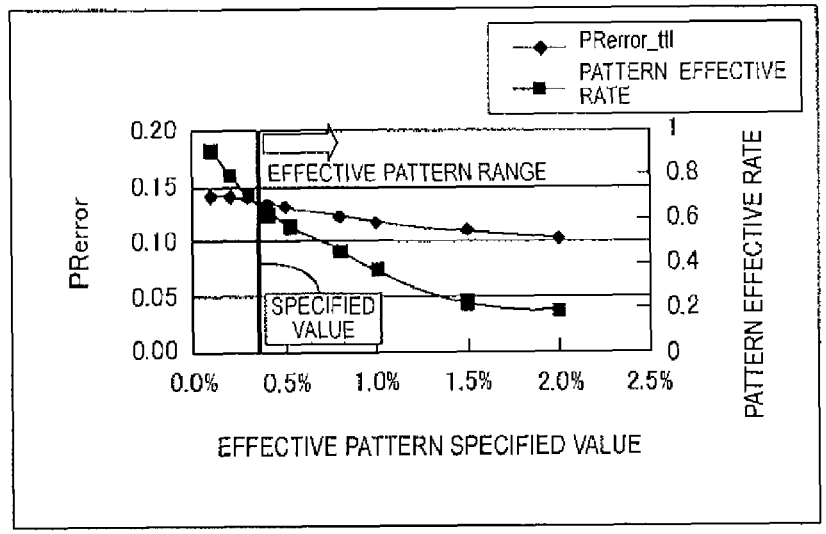
FIG. 3 is a graph showing a relationship between effective patterns, a total evaluation index PRerror_ttl and pattern effective rate.

In FIG. 3, changes in the ratio of the total number of effective patterns to the total number of record patterns within a predetermined range of measurement (pattern effective ratio) are plotted along with the values of changes in the index PRerror_ttl associated with the ratio changes to show a relationship between such changes. In FIG. 3, the vertical axis on the left side represents values of the index PRerror_ttl; the vertical axis on the right side represents pattern effective ratios; and the horizontal axis represents specified values (thresholds) for effective patterns.

It will be understood from FIG. 3 that the specified value can be set such that the accuracy of the characteristic value PRerror_ttl can be maintained even when the value PRerror_ttl is calculated without using record patterns having probabilities of occurrence lower than the specified value that is determined in advance. Specifically, results of an examination of FIG. 3 indicate that there is substantially no change in the value PRerror_ttl even when the predetermined specified value is 0.3%. Since the effective pattern ratio is about 70%, the load of calculation can be reduced by about 30%.

As thus described, the index PRerror_ttl for total evaluation can be calculated with sufficient accuracy by, for example, calculating the index PRerror_ptn(p) only for record patterns having a probability of occurrence equal to or higher than 0.3% instead of calculating the index PRerror_ptn (p) for all record patterns.

Figure 4:
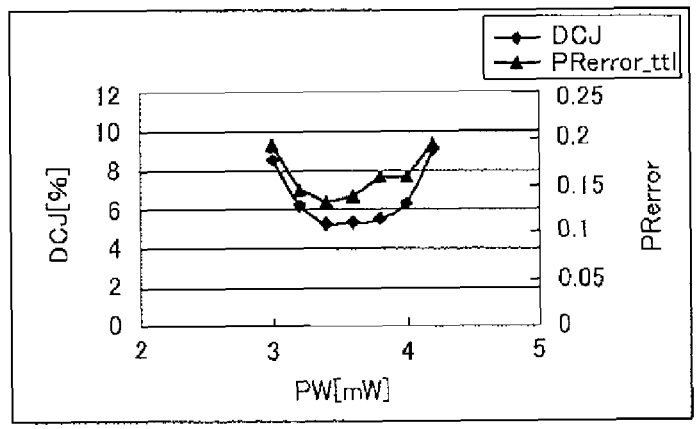
FIG. 4 is a graph showing a relationship between recording power, DCJ, and the total evaluation index PRerror_ttl.
Figure 5:
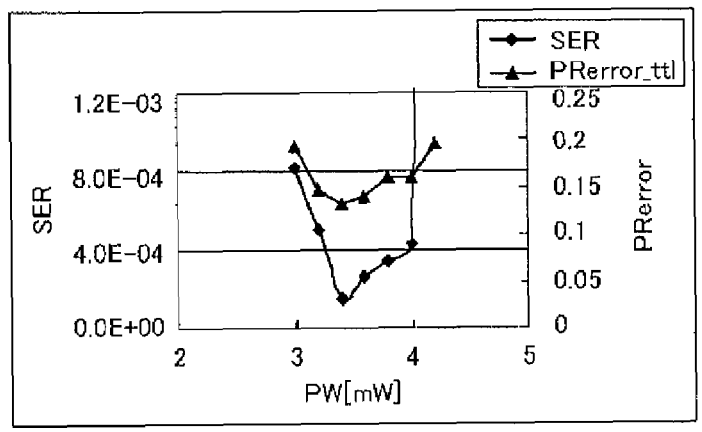
FIG. 5 is a graph showing a relationship between recording power, SER, and the total evaluation index PRerror_ttl.

FIGS. 4 and 5 show changes in the index PRerror_ttl resulting from a continuous change in recording power in comparison with changes in DC jitters (also called DCJ) and a symbol error rate (also called an SER) which are existing evaluation indexes. In FIG. 4, the vertical axis on the left side represents DCJ [°]; the vertical axis on the right side represents the index PRerror_ttl; and the horizontal axis represents recording power [mW]. In FIG. 5, the vertical axis on the left side represents SER; the vertical axis on the right side represents the index PRerror_ttl; and the horizontal axis represents recording power [mW].

FIGS. 4 and 5 indicate that the evaluation value PRerror_ttl is an index which is in a high level of correlation with the existing evaluation indexes (DCJ and SER). Therefore, recording characteristics can be improved by adjusting recording conditions in accordance with changes in the evaluation value PRerror_ttl (the adjustment is referred to as "first changing step"). Specifically, when the index PRerror_ttl can be calculated for a plurality of recording conditions, the recording condition providing a smallest PRerror-ttl value may be adopted and set to obtain most preferable recording characteristics. As will be detailed later, even when the index PRerror_ttl cannot be calculated for a plurality of recording conditions, the recording conditions can be adjusted using a PRerror_ttl value calculated based on results of detection. Referring to the first changing step, in practice, the quality of recording of an optical disk can be kept at a high level by setting the second evaluation index value PRerror_ttl small such that it stays within a range below a certain value taking the data shown in FIGS. 4 and 5 into consideration. Referring to FIG. 4, for example, a DCJ value [%] equal to or lower than about 7% provides a result that serves the purpose, and a PRerror_ttl value equal to or smaller than about 0.17 provides a result that serves the purpose. Referring to FIG. 5, for example, an SER equal to or lower than about 2.0E-04 provides a result that serves such the purpose, and a PRerror_ttl value equal to or smaller than about 0.17 provides a result that serves the purpose just as described above.

(3) Evaluation of the Quantity of Influence of Each Set Record Pattern on Total Evaluation Index PRerror_ttl A description will now be made on a method of evaluating the recording state of each record pattern from a comparison between the influence quantities (PRerror_ptn(p)) of set record patterns which constitute the index PRerror_ttl.

When a signal is written on an optical disk as symbols, the operation is performed using a laser beam while controlling the beam intensity. For example, when a mark having a length of 3T or more among marks having a length nT symbol is written with a constant width, heat is controlled by dividing a simple rectangular wave of a laser beam into a plurality of short rectangular waves, and heat may remain at the end of the write. When writing is performed in such a manner, how to operate a modulated waveform is referred to as "write strategy". At the beginning of a write, a laser beam is radiated while controlling the amounts of forward and backward shifts of the beam from a reference position (0) for a starting position of a top pulse (represented by dTtop) such that a mark having a length nT can be written with a constant width from an intended position.

Figure 6:
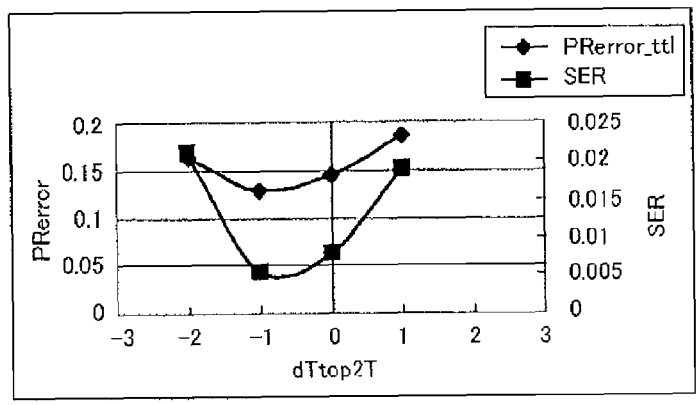
FIG. 6 is a graph showing a relationship between a recording parameter dTtop2T, SER, and the total evaluation index PRerror_ttl.

FIG. 6 shows changes in the index PRerror_ttl and SER that occur when only the symbol y following the space 2T of a particular strategy parameter dTtop2T is varied. In FIG. 6, the vertical axis on the left side represents the index PRerror_ttl; the vertical axis on the right side represents SER; and the horizontal axis represents the strategy parameter dTtop2T. It will be understood that both of the index PRerror_ttl and SER similarly change to draw a U-shaped curve having a minimum value at the bottom thereof. It is shown that both of the index PRerror_ttl and SER reach the minimum values when the value of the parameter is about −1 in practice. This value is detected and reflected in the amount of a shift of the starting position of the top pulse (represented by "dTtop") from the reference position.

Figure 7:
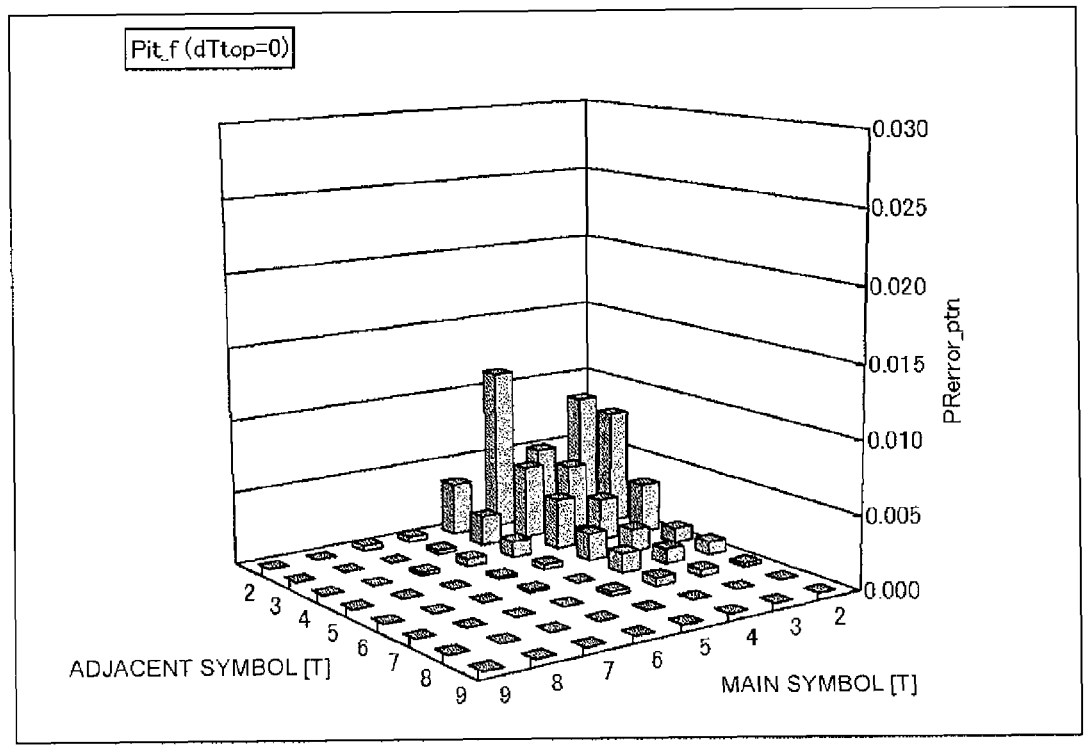
FIG. 7 is a graph showing changes in an evaluation index PRerror_ptn(p) in response to changes in a record pattern.
Figure 8:
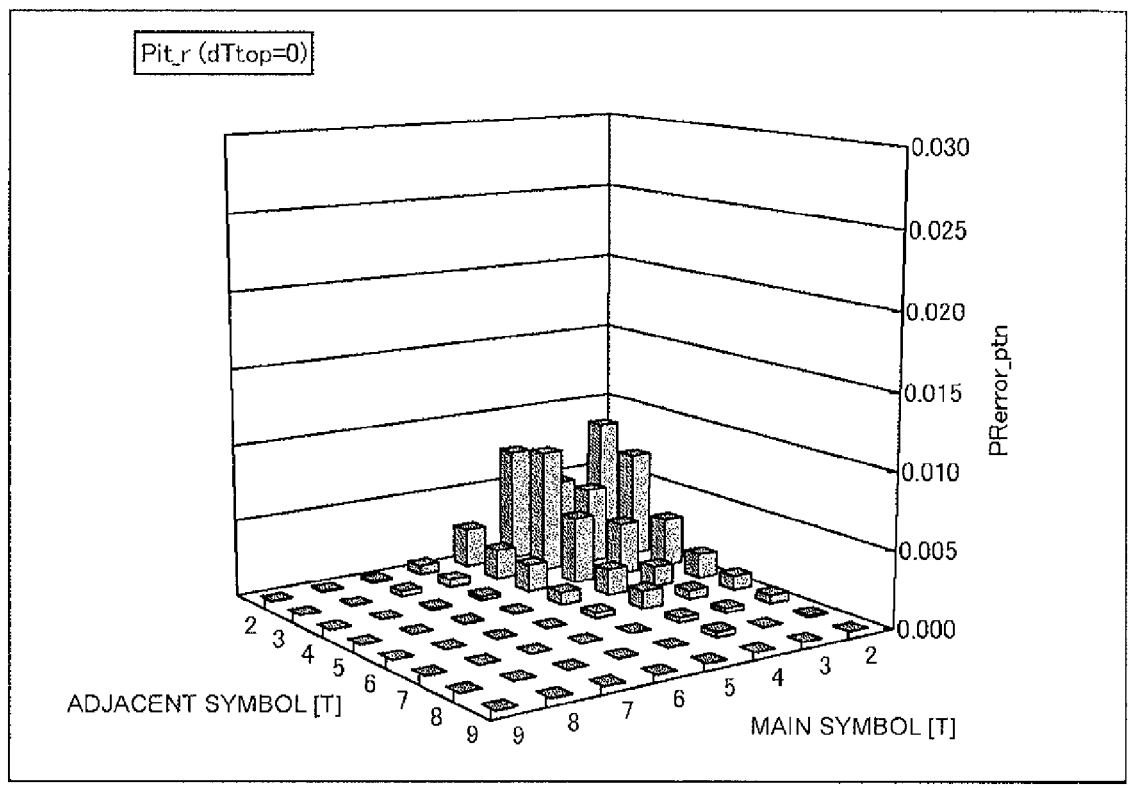
FIG. 8 is a graph showing changes in an evaluation index PRerror_ptn(p) in response to changes in a record pattern.
Figure 9:
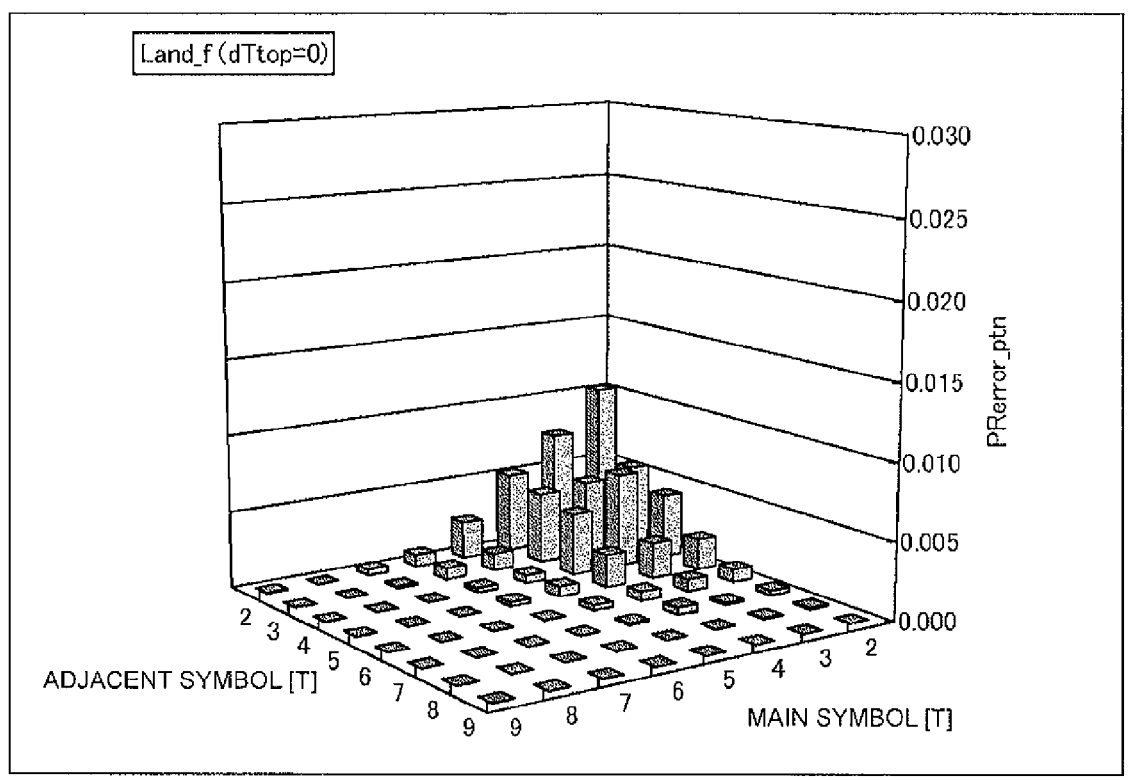
FIG. 9 is a graph showing changes in an evaluation index PRerror_ptn(p) in response to changes in a record pattern.
Figure 10:
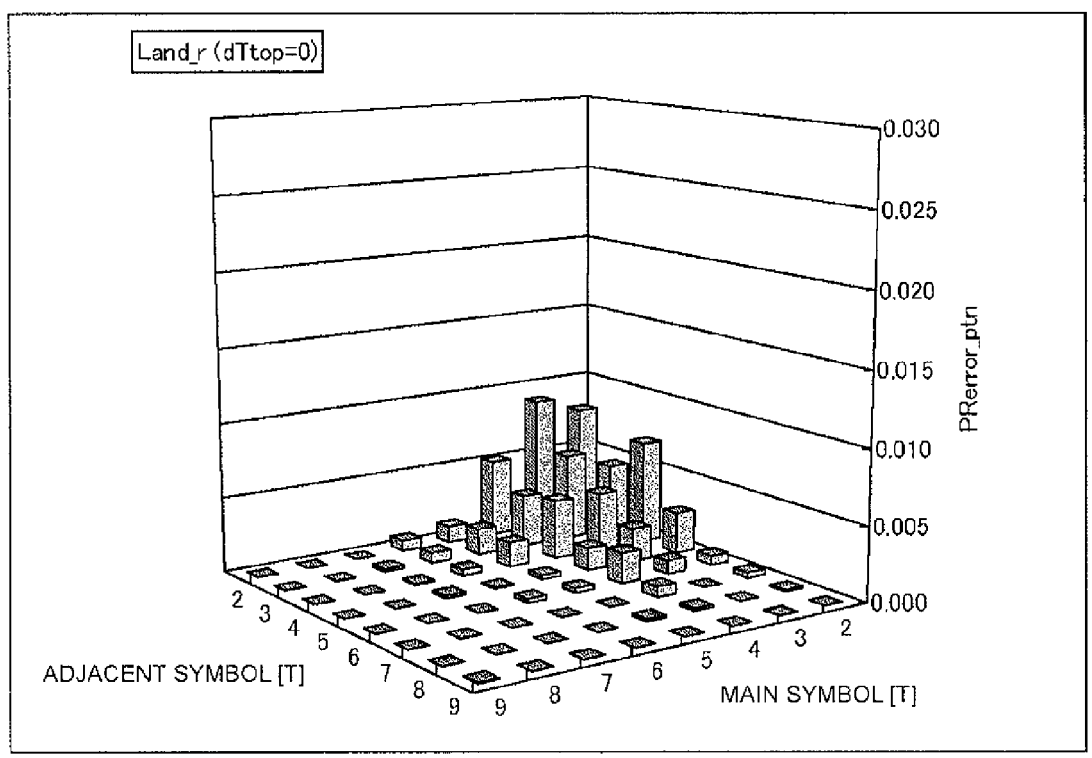
FIG. 10 is a graph showing changes in an evaluation index PRerror_ptn(p) in response to changes in a record pattern.

FIGS. 7 to 10 show general experimental data representing influence quantities (PRerror_ptn(p)) of each of the record patterns which constitute the index PRerror_ttl when a correction amount of dTtop2T=0 in FIG. 6. FIG. 7 shows influence quantities PRerror_ptn(p) resulting from a Pit_f pattern whose main symbol is a mark nT[T] and whose adjacent symbol is a space nT[t] in front of the same. FIG. 8 shows influence quantities PRerror_ptn(p) resulting from a Pit_r pattern whose main symbol is a mark nT[T] and whose adjacent symbol is a space nT[t] behind the same. FIG. 9 shows influence quantities PRerror_ptn(p) resulting from a Land_f pattern whose main symbol is a space nT[T] and whose adjacent symbol is a mark nT[t] in front of the same. FIG. 10 shows influence quantities PRerror_ptn(p) resulting from a Land_r pattern whose main symbol is a space nT[T] and whose adjacent symbol is a mark nT[t] behind the same.

Referring to FIGS. 7 to 10, a pattern including a short symbol such as a mark 2T or space 2T has a great influence quantity because a 2T symbol is unlikely to cause the aperture to open and is therefore likely to result in a deviation from an ideal state and because a pattern including such a symbol has a high probability of occurrence.

Each set record pattern can be evaluated from the influence quantities PRerror_ptn(p) thereof which constitute the total evaluation index value PRerror_ttl.

Because of limitations in graphical representation, FIG. 7 to 10 show only influence quantities of patterns which are combinations of main symbols and adjacent symbols on one side of (before or behind) the main symbols. However, it is preferable to evaluate set patterns which are combinations of main symbols and adjacent symbols on both sides of (before and behind) the main symbols in an actual system. Such a combined pattern may include even a symbol before or behind the adjacent symbol as occasion demands.

A description will now be made on changes in the influence quantities of each pattern that occur when the parameter dTtop2T is continuously changed (between −2 and +1). FIGS. 11 to 14A show changes in Pit_f patterns (whose main symbol is a mark nT[T] and adjacent symbol is a space nT[T] in front) which are significantly affected by the change in the parameter dTtop2T.

Figure 11:
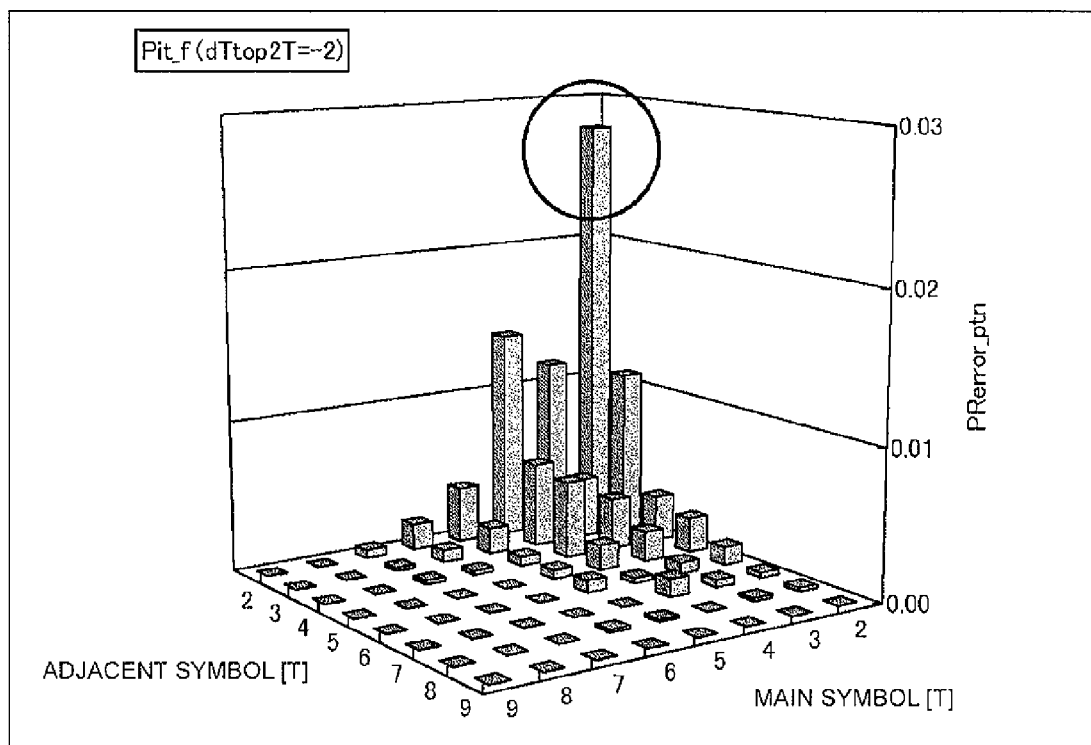
FIG. 11 is a graph showing changes in an evaluation index PRerror_ptn(p) in response to changes in a record pattern.
Figure 12:
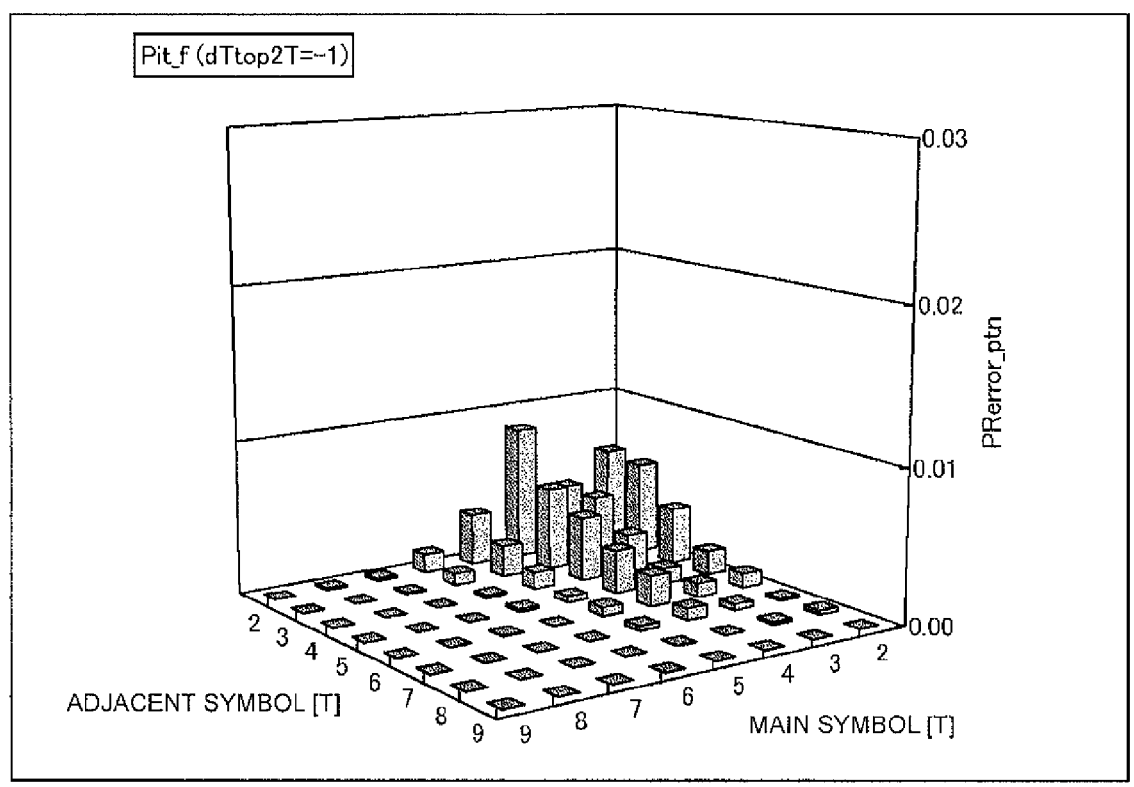
FIG. 12 is a graph showing changes in an evaluation index PRerror_ptn(p) in response to changes in a record pattern.
Figure 13:
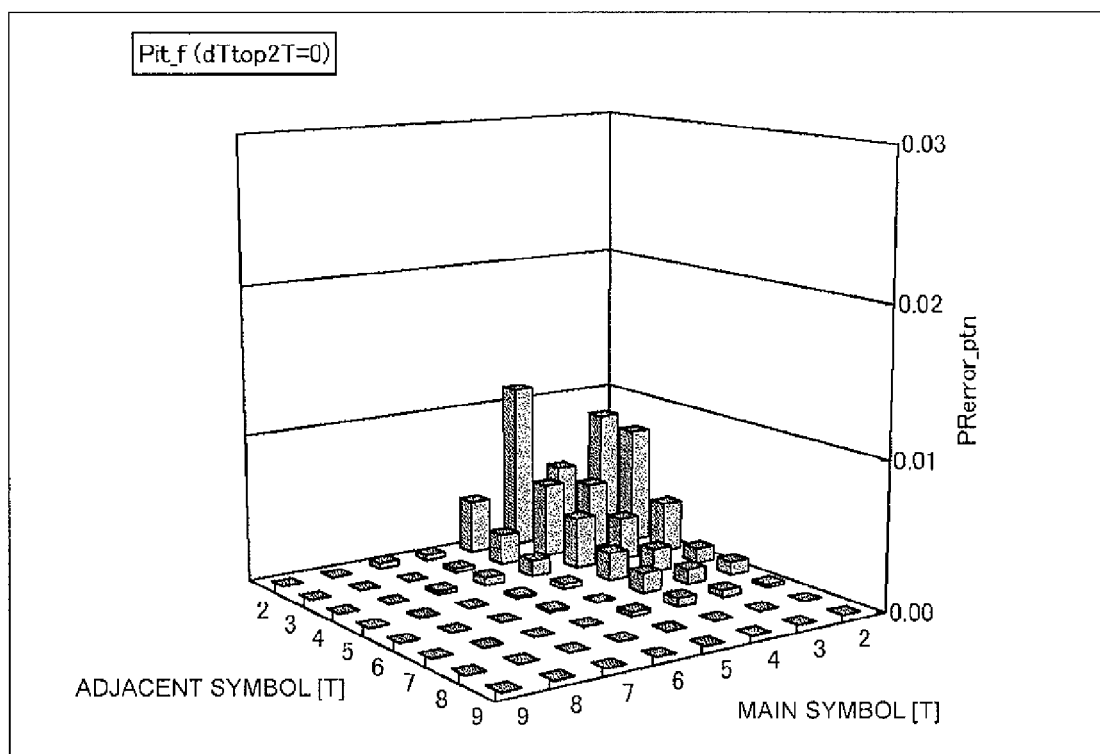
FIG. 13 is a graph showing changes in an evaluation index PRerror_ptn(p) in response to changes in a record pattern.

It is apparent from FIGS. 11 to 14A that the change in the parameter dTtop2T has significant influence on the influence quantity PRerror_ptn(p) associated with a record pattern having a space 2T followed by a mark 2T. In particular, the influence quantity is significantly increased when dTtop2T=−2 (FIG. 11).

Figure 14A:
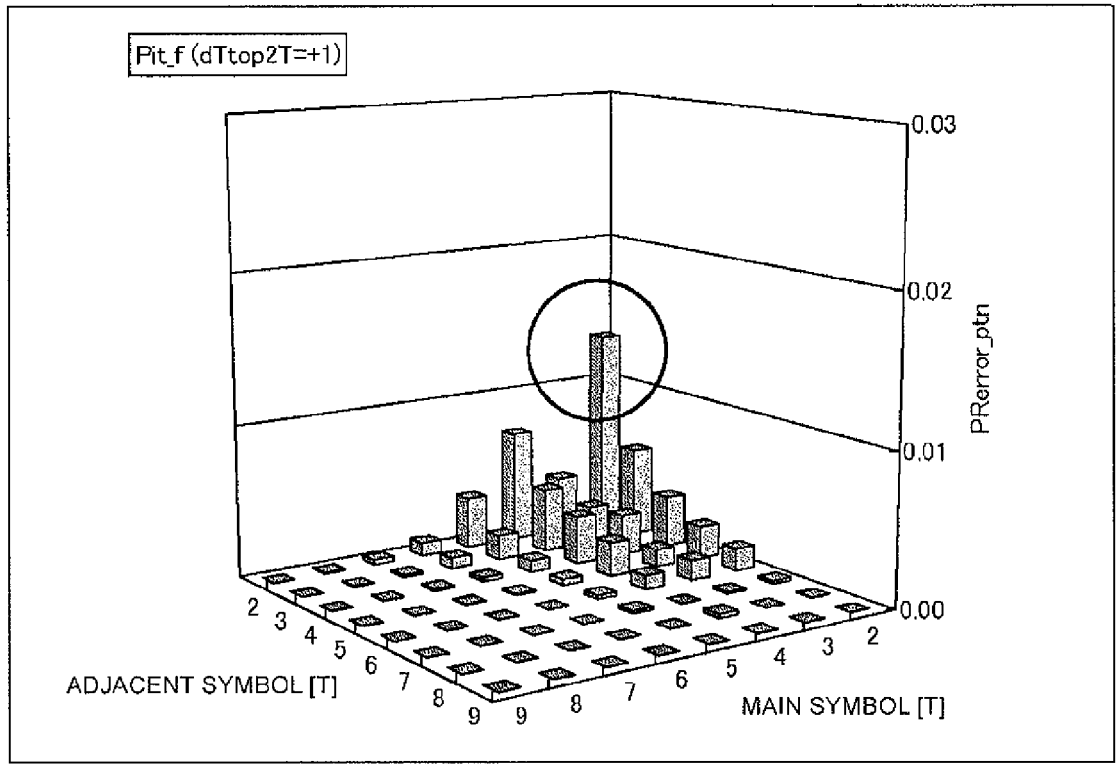
FIG. 14A is a graph showing changes in an evaluation index PRerror_ptn(p) in response to changes in a record pattern.
Figure 14B:
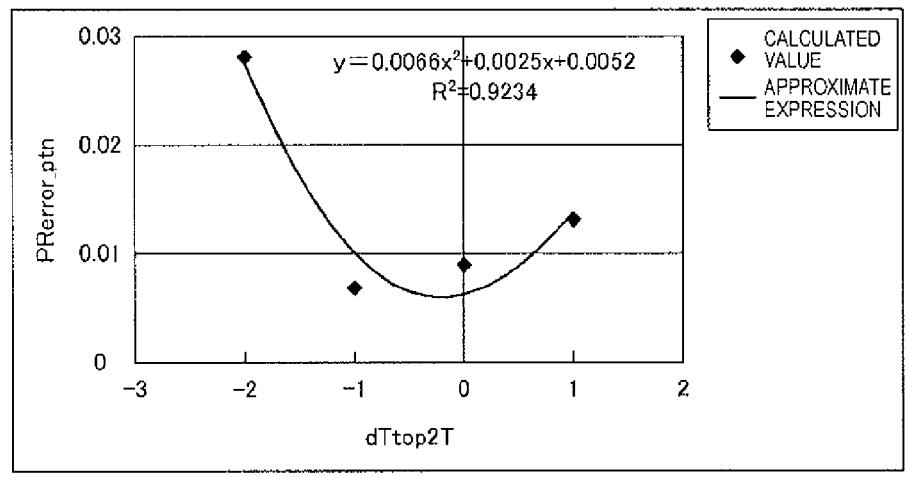
FIG. 14B is a graph showing a relationship between the recording parameter dTtop2T and an evaluation index PRerror_ptn(p)

FIG. 14B shows changes in the influence quantity PRerror_ptn(p) of the record pattern having a space 2T followed by a mark 2T resulting from the change in the recording parameter dTtop2T. In FIG. 14B, the vertical axis represents the influence quantity PRerror_ptn(p), and the horizontal axis represents the parameter dTtop2T. The rhombic points represent actually calculated values, and the curve represents a result of quadratic regression of the actually calculated values. The use of such data makes it possible to optimize or adjust the recording parameter dTtop2T using influence quantities PRerror_ptn(p) (such adjustment is referred to as "second changing step").

Although the recording parameter dTtop2T is varied in the above-described example, it is obvious that the approach may alternatively be carried out using various recording parameters. Although FIGS. 11 to 14A show changes in the influence quantities of patterns which are combinations of a front space and a mark following the same, the selection of combined patterns depends on the recording parameter used. When it is judged that the influence quantity PRerror_ptn(p) of a particular record pattern has a great value which must be corrected, the recording parameter associated with the pattern is identified to adjust the same.

Figure 15:
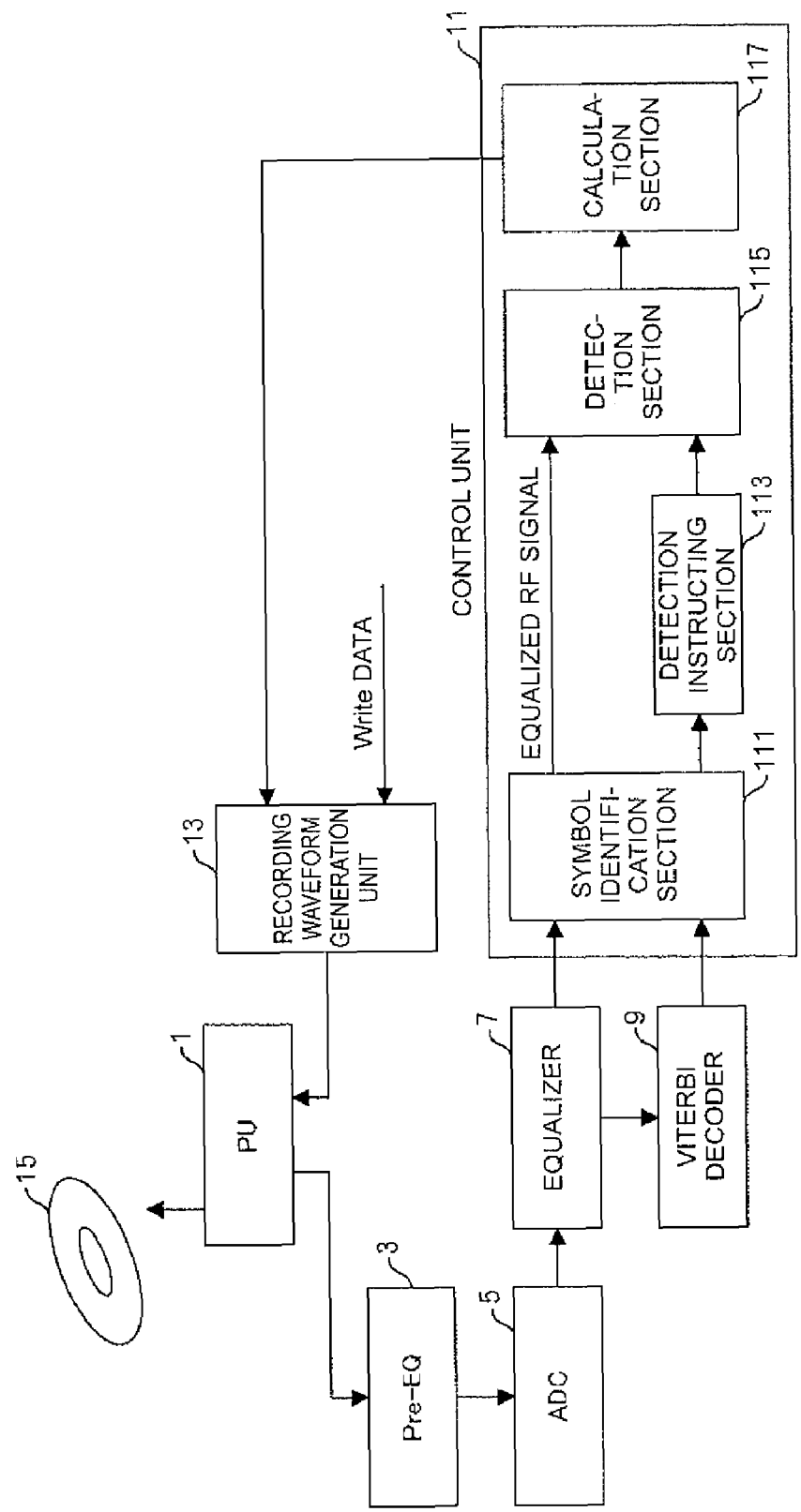
FIG. 15 is a functional block diagram of an optical recording and reproduction device according to an embodiment of the invention.

FIG. 15 shows a functional block diagram of an optical disk recording and reproduction system according to an embodiment of the invention. The optical recording and reproduction system of the present embodiment includes a photo unit (PU) 1 for irradiating an optical disk 15 with a laser beam to perform recording or reproduction, a pre-equalizer 3 for performing a waveform equalizing process on an electric signal from a photo-detector included in the photo unit 1 to facilitate the conversion of the signal into a digital signal at a subsequent step, an ADC (Analog-to-Digital Converter) 5 for converting an analog signal into a digital signal, an equalizer 7 for equalizing imperfect frequency response of a binarized digital signal having inter-symbol interference to a waveform which has a peak amplitude level in a central part of an nT mark in the longitudinal direction thereof and whose amplitude level values in positions apart from the central position under the influence of adjacent nT spaces are at the same ratios as those in a waveform of an ideal signal, a Viterbi decoder 9 for selectively decoding a standard signal series having the highest probability from among reproduction signals which have been waveform-equalized through the conversion at the equalizer 7 to output a maximum likelihood decoding signal (a signal which has been returned to a binarized digital signal) which is close to an ideal signal under no influence of noises, a control unit 11 performing processes using the output of the equalizer 7 and the Viterbi decoder 9, and a recording waveform generation unit 13 for generating a recording waveform for write data according to setting output from the control unit 11 and outputting the waveform to the photo unit 1.

The high-density optical recording and reproduction system may be connected to a display or a personal computer which is not shown. In some occasions, the system may be connected to a network to communicate with one or a plurality of computers.

The control unit 11 includes a symbol identification section 111 for associating the output of the equalizer 7 (a reproduced RF signal having linearly equalized waveform) with the output of the Viterbi decoder 9 (symbol data of a maximum likelihood decoding signal), a detection instructing section 113 for instructing detection of an amplitude level when it is detected based on the symbol data supplied from the symbol identification section 111 that a preset detection pattern, e.g., a recording state of an amplitude level of an nT mark under the influence of an nT space adjacent thereto has been detected, a detection section 115 for detecting the signal state of the amplitude level of the RF signal from the symbol identification section 111 according to the instruction from the detection instructing section 113, and a calculation section 117 having a memory (not shown) for generating a reference state based on the output of the detection section 115 and for performing a calculation as described below to make a setting of a recording waveform generating unit 13. For example, the calculation section 117 may be provided as a combination of programs and a processor for carrying out functions described below. In such a case, the programs may be stored in a memory included in the processor.

The contents of processes performed by the optical recording and reproduction system will now be described with reference to FIGS. 16 to 21. First, a description will be made on a recording condition optimizing process performed using a trial writing area provided at the innermost circumference of an optical disk 15 prior to recording of data.

First, a description will be made with reference to FIG. 16 on a step for creating a reference signal for an amplitude level which is part of operations shown in FIG. 15. For example, the calculation section 117 of the control unit 11 sets predetermined recording conditions, which are parameters specific to each optical disk, in the recording waveform generation unit 13 (step S1). The recording waveform generation unit 13 writes a predetermined record pattern in the trial writing area of the optical disk 15 using the PU 1 according to the recording conditions thus set (step S3). Results of the write performed at step S3 are read by the PU 1, the pre-equalizer 3, the equalizer 7, and Viterbi decoder 9, and the output of the equalizer 7 and the output of the Viterbi decoder 9 are associated with each other by the symbol identification section 111. The detection instructing section 113 instructs the detecting section 115 to detect amplitude levels of all detection patterns (detected strings of symbols [T]) of the RF signal (the detection patterns are identical to recorded patterns if decoding has been accurately performed) or amplitude levels of predetermined effective patterns. The detecting section 115 detects amplitude levels of the RF signal according to an instruction signal from the detection instructing section 113 and outputs results of the detection to the calculation section 117. The calculation section 117 calculates an index PRerror_ptn(p) for each detection pattern p and stores it in a storage device such as a memory (step S5). Since a detection pattern p is detected many times as described above, the index PRerror_ptn(p) is calculated as an average value. The calculation section 117 stores amplitude levels of a particular detection pattern $p_c$ which will be used later. Alternatively, only a peak amplitude value may be stored.

Thereafter, the calculation section 117 calculates an index PRerror_ttl using the index PRerror_ptn(p) for each detection pattern p calculated at step S5 and the probability of occurrence of each detection pattern p stored in a memory in advance and stores the total evaluation index PRerror_ttl in a storage device such as a memory in association with the recording condition set at step S1 (step S7). The data is also used for adjusting a recording condition during data recording.

The calculation section 117 determines whether all of predetermined recording conditions have been set with reference to, for example, the test record (step S9). If there is any unset recording condition, the process returns to step S1. If setting has been completed for all of predetermined recording conditions, the recording condition at which the total evaluation index PRerror_ttl has the smallest value is identified as a best recording condition based on the total evaluation index PRerror_ttl associated with each recording condition (step S11). For example, since recording power resulting in the minimum value of the total evaluation index PRerror_ttl can be identified as shown in FIG. 4, such recording power may be adopted.

The calculation section 117 sets the best recording condition in the recording waveform generation unit 13 (step S13). Amplitude levels of the particular record pattern $p_c$ under the best recording condition are stored in a storage device such as a memory as reference signals (step S15). The data is used for adjusting recording conditions during data recording.

The process as thus described makes it possible to optimize recording conditions using the trial write area based on the total evaluation index PRerror_ttl, and recording power and the like can be set at best recording conditions.

A step of generating reference signals for amplitude levels will now be described with reference to FIG. 17 as a second example of optimizing recording conditions in the trial write area using the evaluation index PRerror_ptn(p) for each pattern.

For example, the calculation section 117 of the control unit 11 sets a predetermined recording parameter in the recording waveform generation unit 13 (step S21). The recording waveform generation unit 13 writes a predetermined record pattern in the trial writing area of the optical disk 15 using the PU 1 according to the recording parameter thus set (step S23). Results of the write performed at step S23 are read by the PU 1, the pre-equalizer 3, the equalizer 7, and Viterbi decoder 9, and the output of the equalizer 7 and the output of the Viterbi decoder 9 are associated with each other by the symbol identification section 111. The detection instructing section 113 instructs the detecting section 115 to detect amplitude levels of a predetermined detection pattern p of the RF signal. The detecting section 115 detects amplitude levels of the RF signal according the detection instructing section 113 and outputs results of the detection to the calculation section 117. The calculation section 117 calculates an index PRerror_ptn(p) for the detection pattern p described above and stores it in association with the recording parameter set at step S21 in a storage device such as a memory (step S25). This data is used for adjusting the recording parameter during data recording. Since the detection pattern p is detected many times as described above, the index PRerror_ptn(p) is calculated as an average value. The calculation section 117 stores amplitude levels of the detection pattern p. Alternatively, only a peak amplitude value may be stored.

Then, the calculation section 117 determines whether all predetermined values of the recording parameters have been set (step S27). If there is any unset recording condition, the process returns to step S21. If setting has been completed for all of the predetermined values of the recording parameter, based on evaluation indexes PRerror_ptn(p) associated with the values of the recording parameter, the calculation section 117 identifies the value of the recording parameter resulting in a minimum value of the evaluation index PRerror_ptn(p) as an optimal value (step S29). As described above, each detection pattern p has a recording parameter for which it is appropriate to make an adjustment. Therefore, an optimal value is identified for such a recording parameter for which it is appropriate to make an adjustment at step S29. For example, as shown in FIG. 14B, a value "−1" of the parameter dTtop2T can be identified as the value at which the evaluation index PRerror_ptn(p) for the detection pattern p having a space 2T followed by a mark 2T is smallest. Therefore, that is adopted as the parameter dTtop2T.

The calculation section 117 sets the optimal value thus identified in the recording waveform generation unit 13 (step S31). Amplitude levels of the detection pattern p at the optimal value are stored in a storage device such as a memory as reference signals (step S33). The data is used for adjusting the recording parameter during data recording.

The process as thus described makes it possible to optimize recording parameters using the trial write area based on evaluation indexes PRerror_ptn(p), and at least part of recording parameters can be optimized.

Figure 18:
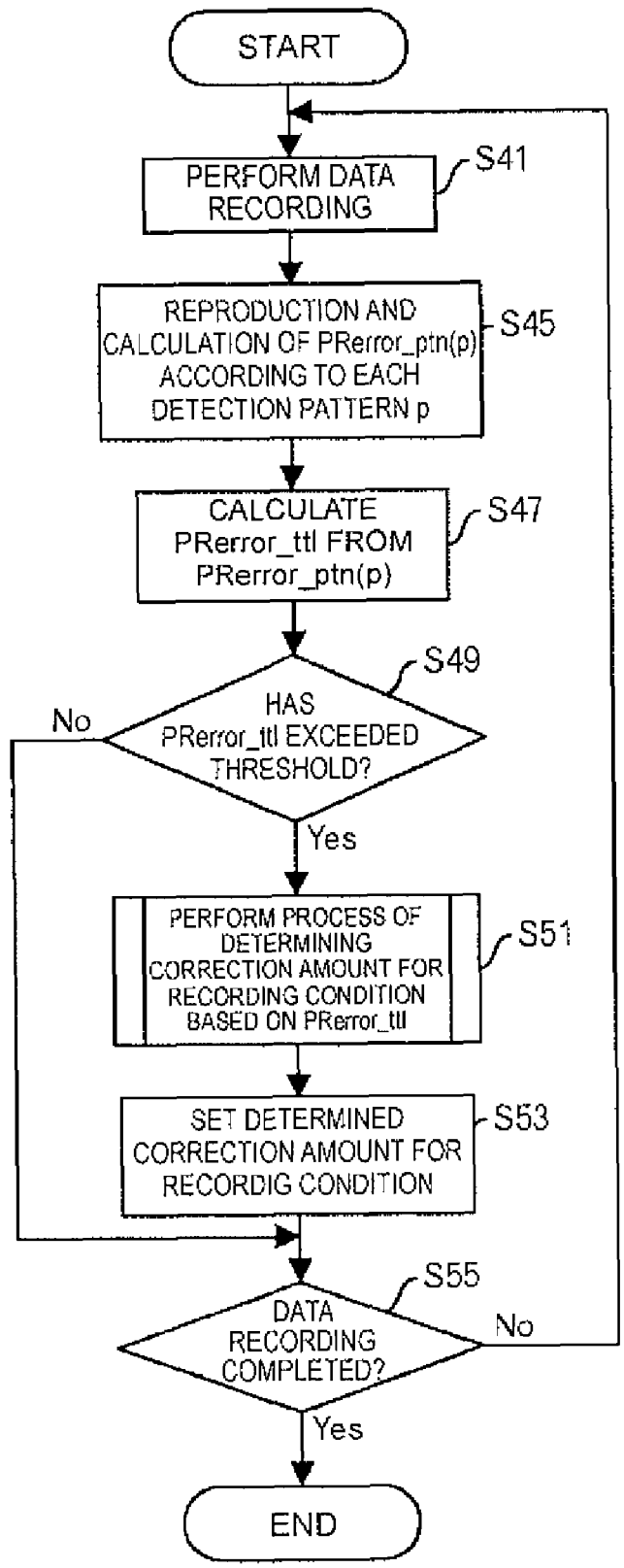
FIG. 18 shows a flow of steps for correcting a recording condition during data recording.

A description will now be made with reference to FIGS. 18 and 19 on a process of adjusting recording conditions after data recording is started.

The description will be made based on FIG. 18 with reference to FIG. 15. The recording waveform generation unit 13 writes data to be written using the PU 1 according to recording conditions set therein (step S41). It is assumed here that data are written in a predetermined amount or for a predetermined period of time. Results of the write performed at step S41 are read by the PU 1, the pre-equalizer 3, the equalizer 7, and Viterbi decoder 9, and the output of the equalizer 7 and the output of the Viterbi decoder 9 are associated with each other by the symbol identification section 111. When the detection instruction section 113 detects all detection pattern or predetermined effective patterns based on the setting made therein, it instructs the detecting section 115 to detect amplitude levels of the RF signal. The detecting section 115 detects amplitude levels of the RE signal according to the detection instructing section 113 and outputs results of the detection to the calculation section 117. The calculation section 117 calculates an index PRerror_ptn(p) for each detection pattern p and stores it in a storage device such as a memory (step S45). Since a detection pattern p is detected many times as described above, the index PRerror_ptn(p) is calculated as an average value. The calculation section 117 stores amplitude levels of a particular detection pattern $p_c$ in the best recording condition which will be used later. Alternatively, only a peak amplitude value may be stored.

Thereafter, the calculation section 117 calculates an index PRerror_ttl using the index PRerror_ptn(p) for each detection pattern p calculated at step S45 and the probability of occurrence of each detection pattern p stored in a memory in advance and stores the index in a storage device such as a memory (step S47).

Then, calculation section 117 determines whether the total evaluation index PRerror_ttl has exceeded a predetermined threshold (step S49). When the total evaluation index PRerror_ttl is smaller than the predetermined threshold, the process proceeds to step S55 because no adjustment of recording conditions is required at this time. On the contrary, when the total evaluation index PRerror_ttl has exceeded the predetermined threshold, the calculation section 117 performs a process of determining a correction amount which is a recording condition based on the total evaluation index PRerror_ttl (step S51).

The process of determining a correction amount as a recording condition will now be described with reference to FIG. 19. First, the calculation section 117 calculates a difference between an amplitude level of an ideal signal for the particular detection pattern $p_c$ and, for example, a reference signal that is identified at step S15 as described with reference to FIG. 16 (step S61). The difference between peak values of the signals may be calculated as described above. Alternatively, differences between regions of the signals other than the peak values may be added. Since it has been determined at step S49 that the total evaluation index PRerror_ttl has exceeded a predetermined threshold, it is assumed that the difference between the amplitude level and the reference signal will never equal 0.

The calculation section 117 determines whether the difference is positive (step S63). If the difference is positive, a recording condition which results in a positive difference and which is associated with the value of the total evaluation index PRerror_ttl calculated at step S47 is identified (step S65) from the relationship between the total evaluation index PRerror_ttl and recording conditions (the result of step S7 shown in FIG. 16). In a case as shown in FIG. 4, the total evaluation index PRerror_ttl has a minimum value when the recording power is 3.3 mW, and either decrease or increase in the recording power from 3.3 mW will result in an increase in the value of the total evaluation index PRerror_ttl. Therefore, when the value of the total evaluation index PRerror_ttl calculated at step S47 is, for example, 0.15, the recording power associated therewith has a value of about 3.1 mW or about 3.7 mW. The direction and amount of correction depend on the value. If the recording power is 3.1 mW, it is increased by 0.2 mW. If the recording power is 3.7 mW, it is decreased by 0.4 mW. The recording power is increased or decreased depending on at least one condition among the characteristics of the medium under data recording, the recording condition, and the detection pattern of interest. For example, such a determination is made based on a type identification code recorded in advance in each optical disk to indicate whether an amplitude level is to be increased or decreased in response to an increase in recording power. For example, when an amplitude level is increased in response to an increase in recording power and when there is a positive difference as described above, it is judged that the recording power is too high or in the same state as described above in which it has a value of about 3.7 mW. Therefore, the recording power is decreased by about 0.4 mW. On the contrary, when an amplitude level is decreased in response to an increase in recording power and when there is a positive difference as described above, it is judged that the recording power is too low or in the same state as described above in which it has a value of about 3.1 mW.

Therefore, the recording power is increased by about 0.2 mW. Such a determination may alternatively be made based on a result of discrimination which is actually made when test recording is carried out instead of a type identification code. Relationships as described above are identified in advance, and an appropriate recording condition is identified at step S65.

The calculation section 117 calculates the difference between the recording condition thus identified and the best recording condition as a correction amount (step S69), and the process returns to the initial step.

When the difference is negative, a recording condition which results in a negative difference and which is associated with the value of the total evaluation index PRerror_ttl calculated at step S47 is identified (step S67) from the relationship between the total evaluation index PRerror_ttl and recording conditions. For example, when it is determined from the type identification code of the optical disk that an amplitude level is increased in response to an increase in recording power and the difference is negative, it is judged that the recording power is too low or in the same state as described above in which it has a value of about 3.1 mW. Therefore, the recording power is increased by about 0.2 mW. On the contrary, when it is determined from the type identification code of the optical disk that an amplitude level is decreased in response to an increase in recording power and the difference is negative, it is judged that the recording power is too high or in the same state as described above in which it has a value of about 3.7 mW. Therefore, the recording power is decreased by about 0.4 mW. Relationships as described above are identified in advance, and an appropriate recording condition is identified at step S67. Then, the process proceeds to step S69.

The description of the process will now be continued by referring to FIG. 18 again. The calculation section 117 sets the correction amount for a recording condition determined at step S51 in the recording waveform generation unit 13 (step S53). Then, it is determined whether data recording has been completed (step S55), and the process returns to step S41 if data recording has not been completed. If data recording has been completed, the process is terminated.

A recording condition can be adjusted even during data recording by performing the above-described process.

Figure 20:
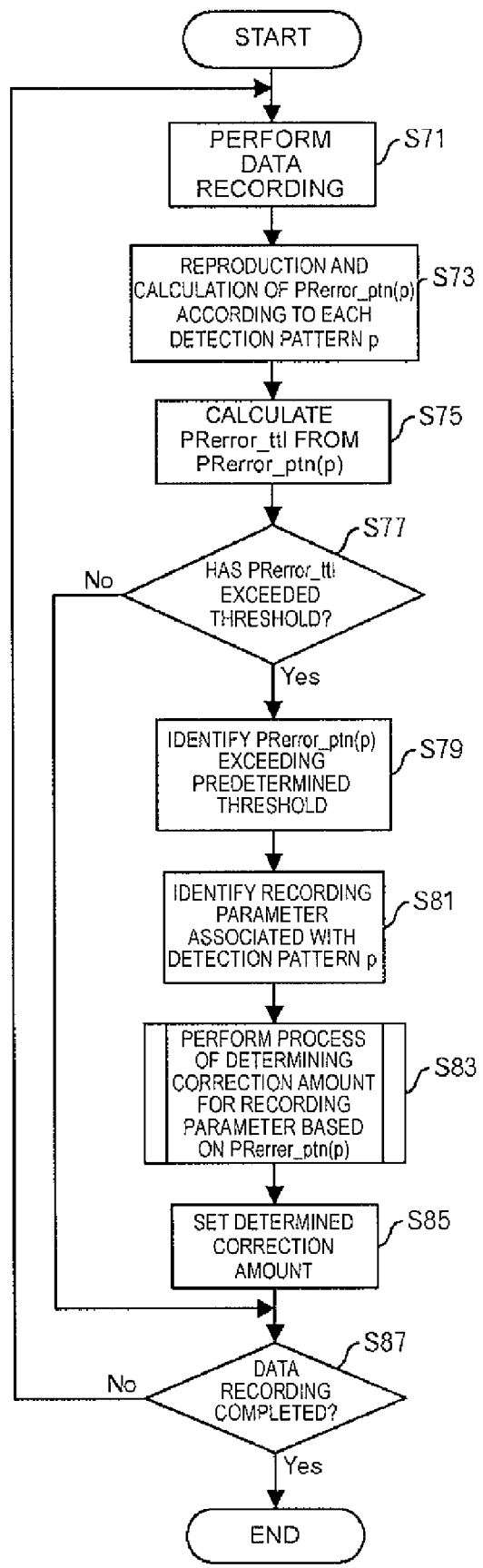
FIG. 20 shows a flow of steps for correcting a recording parameter during data recording.

Next, a process of correcting a recording parameter based on the evaluation index PRerror_ptn(p) will now be described with reference to FIGS. 20 and 21.

The description will be made based on FIG. 20. The recording waveform generation unit 13 writes data to be written using the PU 1 according to recording conditions set therein (step S71). It is assumed here that data are written in a predetermined amount or for a predetermined period of time. Results of the write performed at step S71 are read by the PU 1, the pre-equalizer 3, the equalizer 7, and Viterbi decoder 9, and the output of the equalizer 7 and the output of the Viterbi decoder 9 are associated with each other by the symbol identification section 111. When the detection instruction section 113 detects all detection pattern or predetermined effective patterns based on the setting made therein, it instructs the detecting section 115 to detect amplitude levels of the RF signal. The detecting section 115 detects amplitude levels of the RF signal according to the detection instructing section 113 and outputs results of the detection to the calculation section 117. The calculation section 117 calculates an index PRerror_ptn(p) for each detection pattern p and stores it in a storage device such as a memory (step S73). Since a detection pattern p is detected many times as described above, the index PRerror_ptn(p) is calculated as an average value. The calculation section 117 stores amplitude levels of a particular detection pattern $p_c$ which will be used later. Alternatively, only a peak amplitude value may be stored.

Thereafter, the calculation section 117 calculates an index PRerror_ttl using the index PRerror_ptn(p) for each detection pattern p calculated at step S73 and the probability of occurrence of each detection pattern p stored in a memory in advance and stores the index in a storage device such as a memory (step S75).

Then, calculation section 117 determines whether the total evaluation index PRerror_ttl has exceeded a predetermined threshold (step S77). When the total evaluation index PRerror_ttl is smaller than the predetermined threshold, the process proceeds to step S87 because no adjustment of recording conditions is required at this time. On the contrary, when the total evaluation index PRerror_ttl has exceeded the predetermined threshold, the calculation section 117 identifies any evaluation index PRerror_ptn(p) in the excess of a predetermined threshold (step S79). Alternatively, a predetermined number of evaluation indexes PRerror_ptn(p) in the highest places in the order of magnitude may be identified instead of using the predetermined threshold. Then, recording parameters associated with detection patterns p having the identified evaluation indexes PRerror_ptn(p) are identified (step S81). For example, in the case of a pattern having a space 2T followed by a mark 2T, the pattern may be stored in advance in a memory in association with a parameter ID, e.g., dTtop2T2T, and such association may be used for identification.

Then, the calculation section 117 performs a process of determining a correction amount for a recording parameter based on an evaluation index PRerror_ptn(p) (step S83).

The process of determining a correction amount for a recording condition will now be described with reference to FIG. 21. First, the calculation section 117 calculates a difference between an amplitude level of the particular detection pattern $p_c$ and, for example, a reference signal that is identified at step S33 of FIG. 17 (step S91). The difference between peak values of the signals may be calculated as described above. Alternatively, differences between regions of the signals other than the peak values may be added. Since it has been determined at step S77 that the total evaluation index PRerror_ttl has exceeded a predetermined threshold, it is assumed that the difference between the amplitude level and the reference signal will never equal 0.

The calculation section 117 determines whether the difference is positive (step S93). If the difference is positive, the value of a recording parameter which results in a positive difference and which is associated with the value of the evaluation index PRerror_ptn(p) identified at step S79 is identified (step S95) from the relationship between evaluation indexes PRerror_ptn(p) and recording parameters (the result of step S25 of FIG. 17). In a case as shown in FIG. 14B, the evaluation index PRerror_ptn(p) has an approximated minimum value when the recording parameter dTtop2T is about −0.1. When the evaluation index PRerror_ptn(p) has a value other than the minimum value, the index increases whenever the recording parameter dTtop2T decreases or increases. Therefore, when the value of the evaluation index PRerror_ptn(p) calculated at step S73 is, for example, 0.01, the recording parameter dTtop2T associated therewith has a value of about −1 or about 0.7. The direction and amount of a correction to be made on the value of the recording parameter depend on the value. If the recording parameter has a value of −1, it is increased by 0.9. If the recording parameter has a value of 0.7, the recording power is decreased by 0.8. The recording parameter is increased or decreased depending on at least one condition among the characteristics of the medium under data recording, the recording condition, and the detection pattern of interest. The characteristics of the medium are preferably determined as follows. For example, the amplitude level of a detection pattern p is stored in association with each value of the recording parameter at step S25 (see FIG. 17). It is determined in advance whether the amplitude level increases or decreases in response to an increase in the recording parameter by executing step S25 several times, and the result of such determination is used. For example, when it is judged that the amplitude level increases in response to an increase in the recording parameter dTtop2T from the result of determination and when there is a positive difference as described above, it is judged that the recording parameter dTtop2T is too large or in the same state as described above in which it has a value of 0.7. Therefore, the recording parameter dTtop2T is decreased by 0.8. On the contrary, when it is judged that the amplitude level decreases in response to an increase in the recording parameter dTtop2T from the result of determination and when there is a positive difference as described above, it is judged that the recording parameter dTtop2T is too small or in the same state as described above in which it has a value of about −1. Therefore, the recording parameter dTtop2T is increased by 0.9. Relationships as described above are identified in advance, and an appropriate recording parameter value is identified at step S95.

The calculation section 117 calculates the difference between the recording parameter value thus identified and the best recording parameter value as a correction amount (step S99), and the process returns to the initial step.

When the difference is negative, a recording parameter value which results in a negative difference and which is associated with the value of the evaluation index PRerror_ptn(p) is identified (step S97) from the relationship between the evaluation index PRerror_ptn(p) and recording parameter. For example, when it is judged from the result of the determination in advance that the amplitude level increases in response to an increase in the recording parameter dTtop2T and when there is a negative difference as described above, it is judged that the recording parameter dTtop2T is too small or in the same state as described above in which it has a value of about −1. Therefore, the value of the recording parameter dTtop2T is increased by about 0.9. On the contrary, when it is judged from the result of the determination in advance that the amplitude level decreases in response to an increase in the recording parameter dTtop2T and when there is a negative difference as described above, it is judged that the value of the recording parameter dTtop2T is too high or in the same state as described above in which it has a value of about 0.7. Therefore, the value of the recording parameter dTtop2T is decreased by about 0.8. Relationships as described above are identified in advance, and an appropriate recording parameter value is identified at step S97. Then, the process proceeds to step S99.

Referring to FIG. 20 again, the calculation section 117 sets the correction amount for the recording parameter determined at step S83 in the recording waveform generation unit 13 (step S85). Then, it is judged whether data recording has been completed (step S87), and the process returns to step S71 when data recording has not been completed. When data recording has been completed, the process is terminated.

A recording parameter can be adjusted even during data recording by performing the above-described process.

Figure 16:
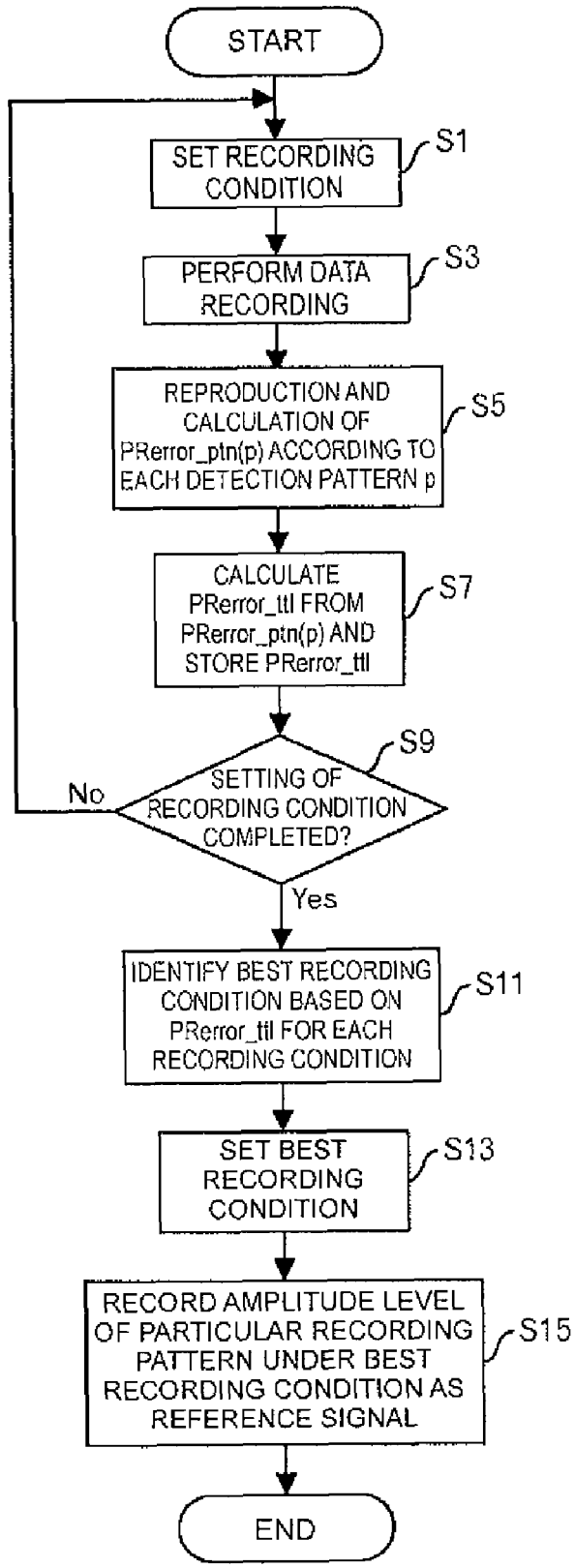
FIG. 16 shows a flow of steps for optimizing recording conditions before recording data.
Figure 17:
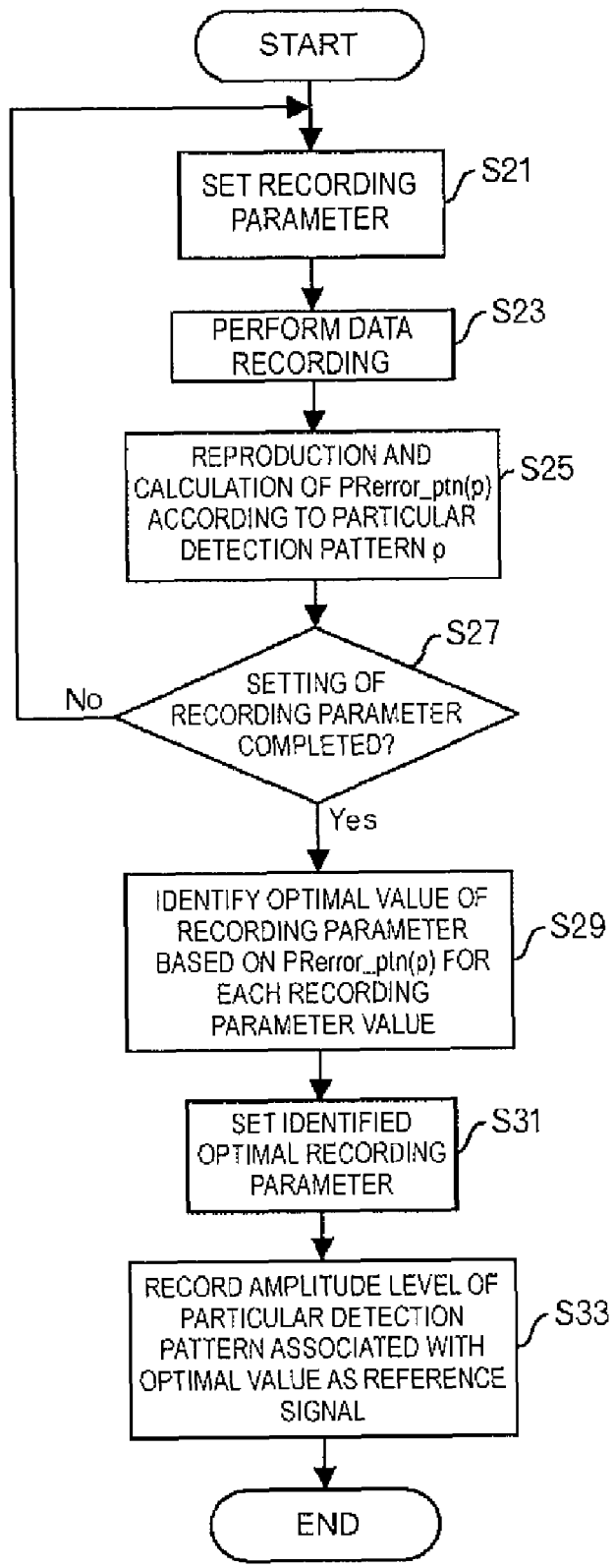
FIG. 17 shows a flow of steps for optimizing recording parameters before recording data.
Figure 19:
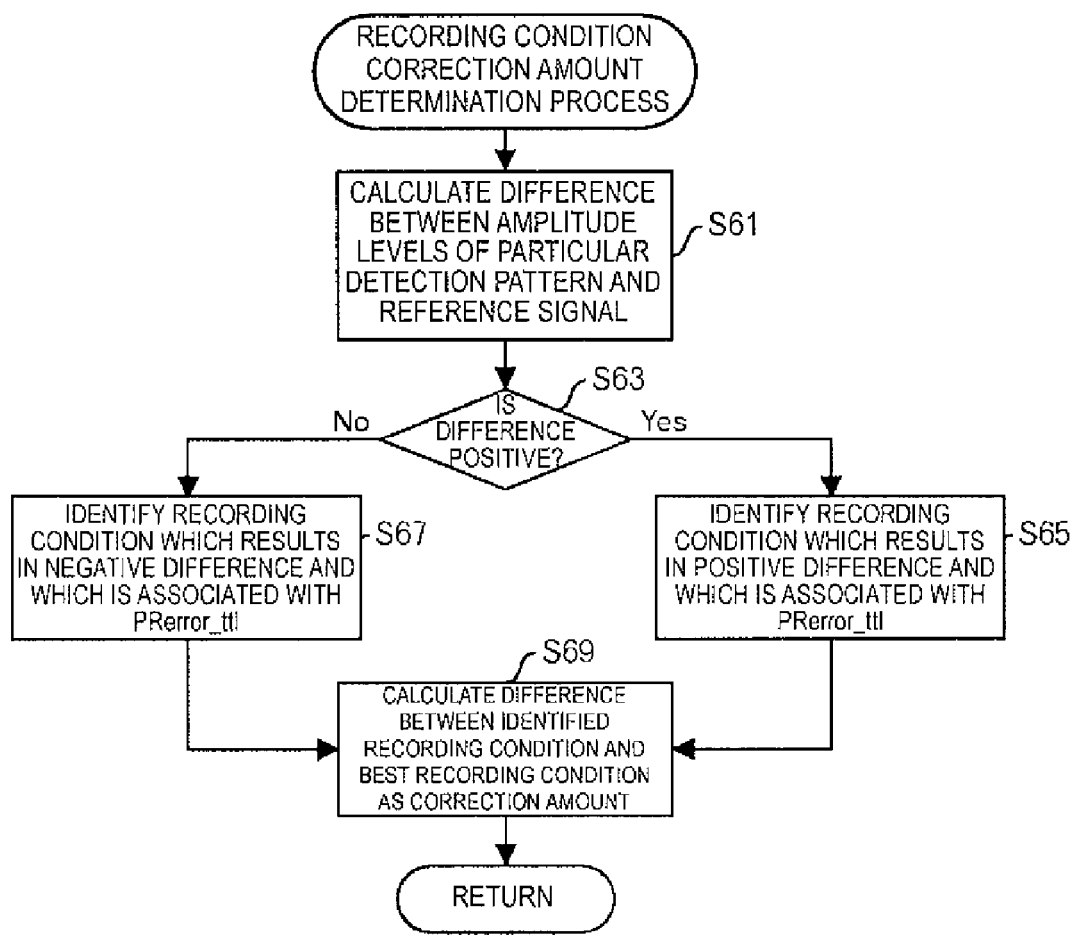
FIG. 19 shows a flow of steps of a process of determining a correction amount for a recording condition.
Figure 21:
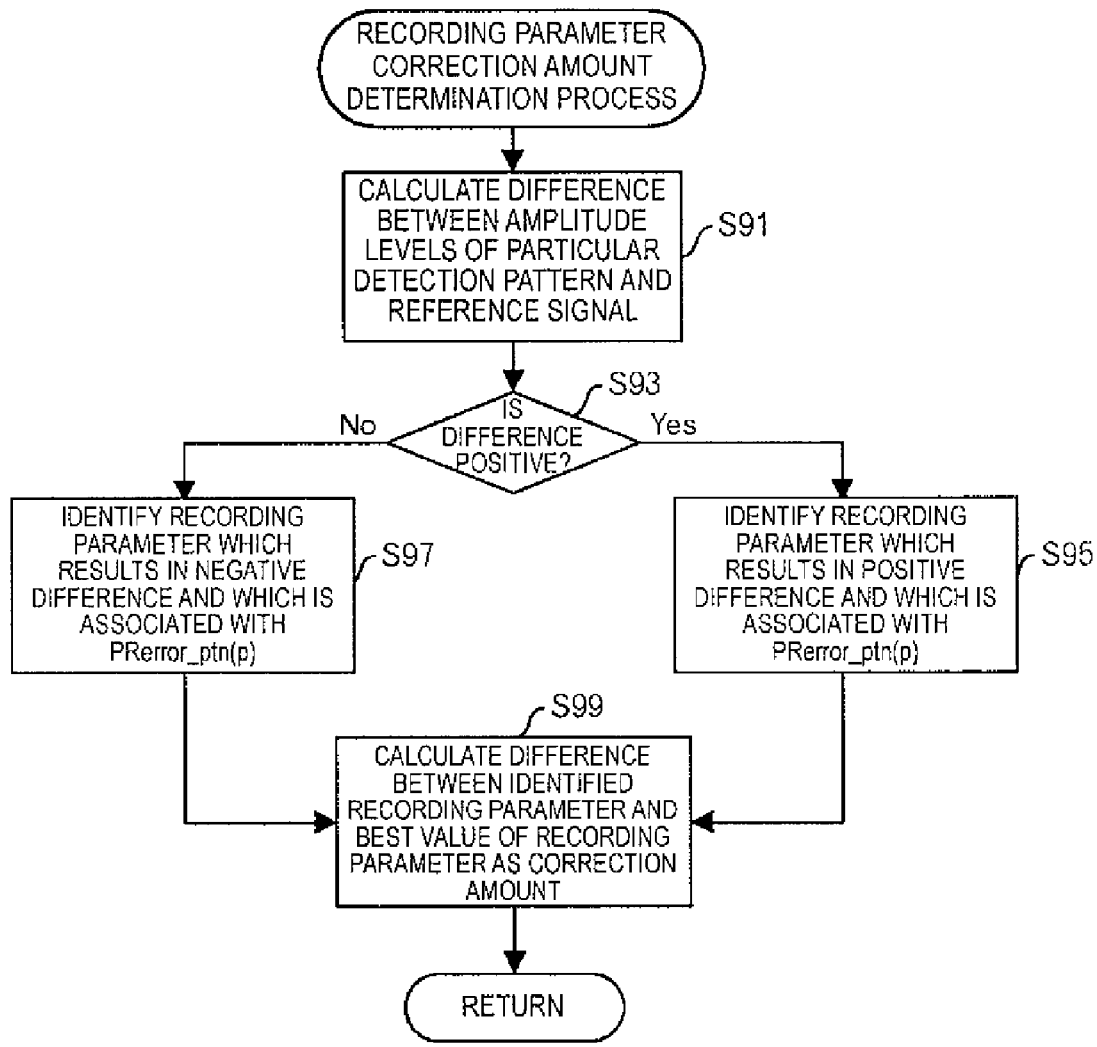
FIG. 21 shows a flow of steps of a process of determining a correction amount for a recording parameter.

While the description has addressed examples in which the value of the reference signal in the processing flow shown in FIG. 19 or 21 and the relationship between the total evaluation index PRerror_ttl and recording conditions shown in FIG. 4, and the relationship between the evaluation index PRerror_ptn(p) and recording parameters shown in FIG. 14B are identified through the processing flows shown in FIGS. 16 and 17, such values or relationships may alternatively be stored in a memory in advance. When the optical disk recording and reproduction device is connected to a network, such data may be acquired from another computer. Further, the processing flow shown in FIG. 16 or 17 may include a step for correcting or updating data stored in a memory in advance.

Although FIG. 19 or 21 shows a case in which data recording is temporarily interrupted, a recording condition or recording parameter may be adjusted concurrently with data recording.

FIGS. 16 and 17 show examples in which data is reproduced after recording it according to one recording condition and the data is reproduced again after recording it according to another recording condition. Data may alternatively be reproduced after recording it according to all recording conditions.

Other modifications may be made in the processing flow as occasion demands.

Although a preferred embodiment of the invention has been described above, the invention is not limited to the embodiment. For example, the functional block diagram of the optical disk recording and reproduction device shown in FIG. 15 is merely an example, and the invention may be implemented without being limited to the configuration of functional blocks shown in FIG. 15 as long as the above-described functions can be achieved.

Figure 22:
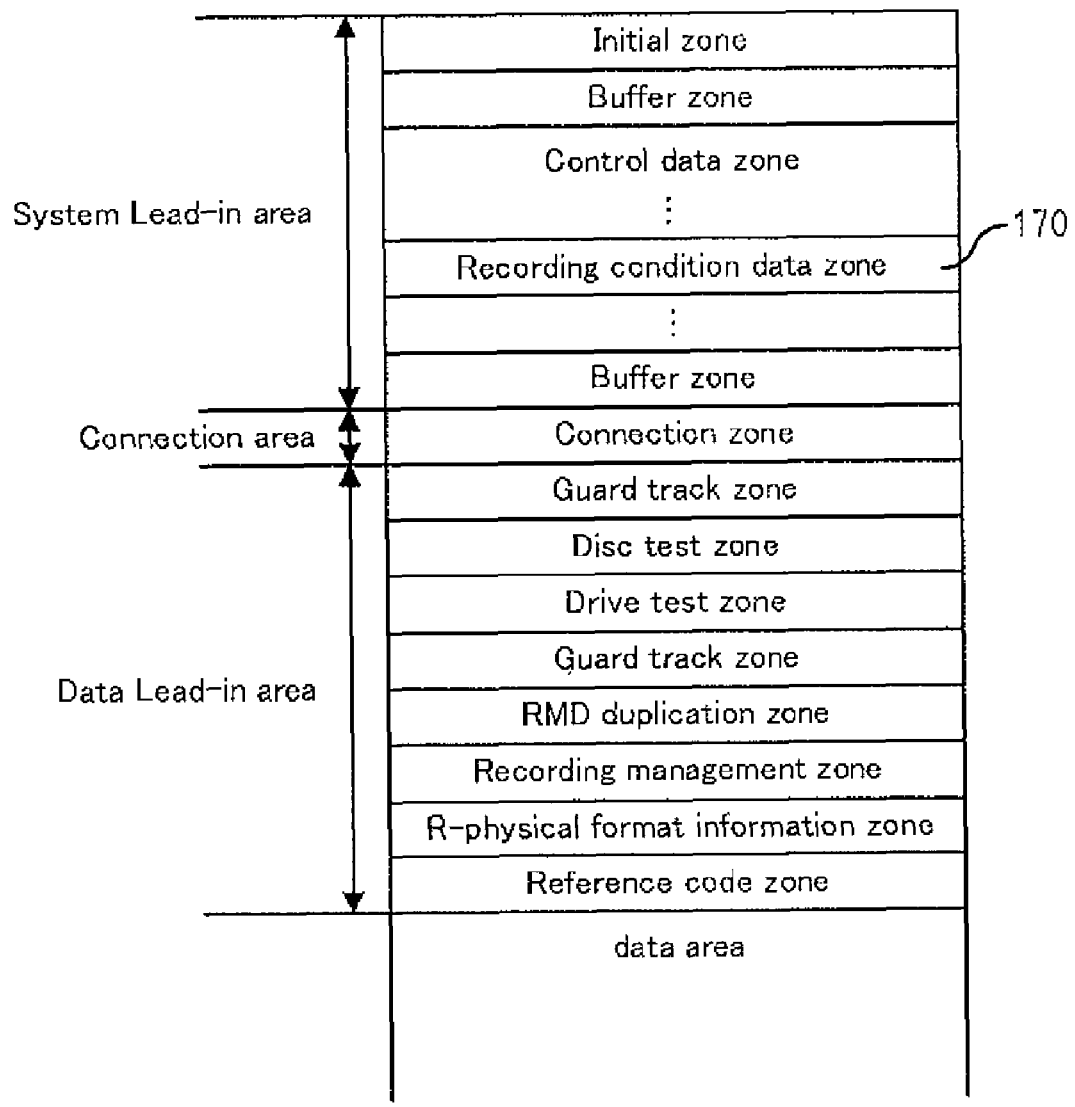
FIG. 22 is an illustration showing an example of a data structure for storing reference data in an optical disk.

The above description has referred to an example in which the value of a recording parameter dTop2T is adjusted. When adjustment is required for a space at the end of a detection pattern conversely, a parameter Tlp of a trailing edge of a recording pulse is adjusted. In this way, a recording parameter that is appropriate for a detection pattern of interest is identified and adjusted in advance. Although the above description of the embodiment has addressed an example in which reference data such as thresholds used for adjusting recording conditions during data recording are stored in a memory incorporated in the calculation section 117 or a memory external to the calculation section 117, it is not essential to store such data in a memory. For example, the data may alternatively be stored in an optical disk 15. When the data are stored in an optical disk 15, they may be stored in a lead-in region as shown in FIG. 22. The lead-in region has three general divisions, i.e., a system lead-in area, a connection area, and a data Lead-in area. The system lead-in area includes an initial zone, a buffer zone, a control data zone, and another buffer zone. The connection area includes a connection zone. The data lead-in area includes a guard track zone, a disk test zone, a drive test zone, another guard track zone, an RMD duplication zone, a recording management zone, an R-physical format information zone, and a reference code zone. In the present embodiment, the control data zone of the system lead-in area includes a recording condition data zone 170.

The reference data to be held in a memory are stored in the recording condition data zone 170 and are read as occasion demands. Referring to values to be recorded, values that disks 15 have on average may be registered indiscriminately. Alternatively, values according to results of tests performed on each optical disk 15 prior to shipment may be registered in the disk.

When an optical disk 15 to be recorded holds values specific to the same, processing loads may be reduced at the disk drive. Values stored in an optical disk 15 may be corrected for as occasion demands before they are used.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A data recording evaluation method, comprising:
   (i) reproducing a result of data recording performed on an optical disk and detecting reproduction signals based on the reproduction;
   (ii) identifying a plurality of detection patterns based on the detected reproduction signals;
   (iii) measuring a value D(x) of the reproduction signal associated with each detection pattern P wherein x is a data profile number;
   (iv) calculating a first evaluation index value PRerror_ptn (p) using equation (1) based on the measured value D(x) and a reference value R(x) for each detection pattern P, $$\text{PRerror\_ptn}(p) = \sqrt{\left\{\sum_{x=a}^{a+n-1}(D(x)-R(x))^2\right\}/n} \quad (1)$$

wherein a is a calculation starting data number, and n is the number of calculated data samples;
   (v) evaluating data recording conditions based on the first evaluation index value;
   (vi) calculating a second evaluation index value PRerror_ttl using equation (2) from the plurality of detection patterns, $$\text{PRerror\_ttl} = \Sigma_p \text{PRerror\_ptn}(p) * \text{Probability of Occurrence}(p) \quad (2)$$

; and
   (vii) identifying the detection patterns more affecting the second evaluation index value than do other detection patterns, wherein the more affecting detection patterns are selected as the plurality of detection patterns in step (ii), followed by steps (iii) to (v).

2. A data recording evaluation method according to claim 1, further comprising changing a recording condition for data recording based on the second evaluation index value.

3. A data recording evaluation method according to claim 1, further comprising changing a recording parameter used for data recording based on the first evaluation index values of the detection patterns identified.

4. A data recording evaluation method according to claim 2, wherein the changing comprises identifying a recording condition in a range in which the second evaluation index value is equal to or smaller than a certain value from data indicating a relationship between the recording condition and the second evaluation index value calculated based on data obtained by reproducing a result of data recording performed under the recording condition.

5. A data recording evaluation method according to claim 2, wherein the changing comprises calculating a correction amount for the present recording condition using the present second evaluation index value and data indicating a relationship between the recording condition and the second evaluation index value calculated based on data obtained by reproducing a result of data recording performed under the recording condition for a predetermined period.

6. A data recording evaluation method according to claim 4, wherein the data indicating a relationship between the recording condition and the second evaluation index value calculated based on data obtained by reproducing a result of data recording performed under the recording condition for a predetermined period is data obtained when test recording is carried out.

7. A data recording evaluation method according to claim 3, wherein the changing comprises identifying a recording parameter at which the first evaluation index value is optimal from data indicating a relationship between the recording parameter and the first evaluation index value calculated based on data obtained by reproducing a predetermined period of a result of data recording performed using the recording parameter.

8. A data recording evaluation method according to claim 3, wherein the changing comprises calculating a correction amount for the present recording parameter using the present first evaluation index and data indicating a relationship between the recording parameter and the first evaluation index value calculated based on data obtained by reproducing a predetermined period of a result of data recording performed using the recording parameter.

9. A data recording evaluation method according to claim 7, wherein the data indicating a relationship between the recording parameter and the first evaluation index value calculated based on data obtained by reproducing a predetermined period of a result of data recording performed using the recording parameter is data obtained when test recording is performed.

10. A non-transitory computer readable media having stored thereon executable instructions for causing a processor to execute the data recording evaluation method according to claim 1.

11. A processor including a memory in which executable instructions according to claim 10 is stored.

12. The data recording evaluation method according to claim 1, wherein the detection pattern is a pattern including at least one mark and one space.

13. The data recording evaluation method according to claim 1, wherein the detection pattern is a detection pattern having a probability of occurrence equal to or higher than a certain value.

14. A non-transitory computer readable media having stored thereon executable instructions for causing a processor to execute the data recording evaluation method according to claim 12.

15. A non-transitory computer readable media having stored thereon executable instructions for causing a processor to execute the data recording evaluation method according to claim 13.

16. A non-transitory computer readable media having stored thereon executable instructions for causing a processor to execute the data recording evaluation method according to claim 2.

17. A non-transitory computer readable media having stored thereon executable instructions for causing a processor to execute the data recording evaluation method according to claim 3.

18. A non-transitory computer readable media having stored thereon executable instructions for causing a processor to execute the data recording evaluation method according to claim 4.

19. A non-transitory computer readable media having stored thereon executable instructions for causing a processor to execute the data recording evaluation method according to claim 5.

20. A non-transitory computer readable media having stored thereon executable instructions for causing a processor to execute the data recording evaluation method according to claim 6.

21. A non-transitory computer readable media having stored thereon executable instructions for causing a processor to execute the data recording evaluation method according to claim 7.

22. A non-transitory computer readable media having stored thereon executable instructions for causing a processor to execute the data recording evaluation method according to claim 8.

23. A non-transitory computer readable media having stored thereon executable instructions for causing a processor to execute the data recording evaluation method according to claim 9.

* * * * *